US012712753B1

(12) United States Patent
Straka et al.

(10) Patent No.: US 12,712,753 B1
(45) Date of Patent: Aug. 18, 2026

(54) SYSTEMS AND METHODS FOR SELECTIVELY REVEALING VERIFIABLE PRIVATE INFORMATION ON A BLOCKCHAIN

(71) Applicant: APTOS FOUNDATION, George Town (KY)

(72) Inventors: Michael Straka, Austin, TX (US); Ioan Alin Tomescu Nicolescu, Austin, TX (US)

(73) Assignee: APTOS FOUNDATION, George Town (KY)

( * ) Notice: Subject to any disclaimer, the term of this patent is extended or adjusted under 35 U.S.C. 154(b) by 0 days.

(21) Appl. No.: 19/337,570

(22) Filed: Sep. 23, 2025

(51) Int. Cl.

| | |
|---|---|
| ***H04L 9/32*** | (2006.01) |
| ***G06F 21/60*** | (2013.01) |
| ***H04L 9/00*** | (2022.01) |
| ***H04L 9/08*** | (2006.01) |
| ***H04L 9/40*** | (2022.01) |

(52) U.S. Cl.
CPC .............. *H04L 9/50* (2022.05); *G06F 21/602* (2013.01); *H04L 9/088* (2013.01); *H04L 9/3221* (2013.01); *H04L 9/3247* (2013.01)

(58) Field of Classification Search
CPC ....... H04L 9/50; H04L 9/3221; H04L 9/3247; G06F 21/602
See application file for complete search history.

(56) References Cited

U.S. PATENT DOCUMENTS

| | | | | |
|---|---|---|---|---|
| 10,771,459 | B2 | 9/2020 | Kim et al. | |
| 10,949,511 | B2 | 3/2021 | Frederick et al. | |
| 11,177,964 | B2 | 11/2021 | McLean et al. | |
| 11,196,745 | B2 | 12/2021 | Wei | |
| 11,233,792 | B2 | 1/2022 | Mittal et al. | |
| 11,258,778 | B2 | 2/2022 | Cheng et al. | |
| 11,522,711 | B2 | 12/2022 | Clements | |
| 11,876,905 | B2 | 1/2024 | Wang et al. | |
| 12,113,912 | B2 * | 10/2024 | Jang | H04L 9/3263 |
| 12,316,778 | B2 * | 5/2025 | Sorniotti | H04L 9/3263 |
| 12,355,903 | B2 | 7/2025 | Bertin et al. | |

(Continued)

FOREIGN PATENT DOCUMENTS

| | | | |
|---|---|---|---|
| NZ | 745996 | A | 12/2023 |
| WO | 2023183778 | A1 | 9/2023 |

*Primary Examiner* — Phy Anh T Vu

(57) ABSTRACT

Systems and methods include receiving from a keyless account service, in response to an authentication request, a keyless account service signature including a cryptographic signature over a user identifier, a managing application identifier of a managing application, a nonce and to-be-revealed data, where the managing application manages activities by the user on a blockchain, and where the nonce is populated with a public key associated with the authentication request. An activity signature is generated for a particular activity based on the keyless account service signature and at least one to-be-revealed data field associated with the to-be-revealed data of the authentication request. The particular activity is submitted to the blockchain with the activity signature and the to-be-revealed information, where the blockchain is configured to validate the particular activity based on validating the activity signature based on the keyless account service signature and the at least one to-be-revealed data field.

24 Claims, 8 Drawing Sheets

(56) References Cited

U.S. PATENT DOCUMENTS

| | | | | |
|---|---|---|---|---|
| 12,367,483 | B1 * | 7/2025 | Pezeshki | G06Q 20/3829 |
| 12,432,066 | B2 | 9/2025 | Harrison et al. | |
| 12,506,605 | B1 | 12/2025 | Dimitrov et al. | |
| 12,506,619 | B1 | 12/2025 | Dimitrov et al. | |
| 12,526,155 | B2 * | 1/2026 | Padmanabhan | G06F 21/6218 |
| 2023/0070824 | A1 * | 3/2023 | Korwin-Gajkowski | H04L 63/0428 |
| 2023/0185894 | A1 * | 6/2023 | Sorensen | H04L 9/3073 726/7 |
| 2023/0298015 | A1 * | 9/2023 | Kiraz | H04L 9/0861 |
| 2024/0179020 | A1 * | 5/2024 | Green | H04L 9/50 |
| 2024/0202725 | A1 * | 6/2024 | Anapliotis | G06Q 30/0607 |
| 2024/0214215 | A1 | 6/2024 | Geng et al. | |
| 2025/0193013 | A1 | 6/2025 | Wu et al. | |
| 2025/0226990 | A1 | 7/2025 | Chen | |

* cited by examiner

SYSTEMS AND METHODS FOR SELECTIVELY REVEALING VERIFIABLE PRIVATE INFORMATION ON A BLOCKCHAIN

FIELD OF TECHNOLOGY

The present disclosure generally relates to computer-based systems and methods for selectively revealing verifiable private information on a blockchain.

BACKGROUND OF TECHNOLOGY

A blockchain is a distributed ledger with growing lists of records (blocks) that are securely linked together via cryptographic hashes. Typically, each block contains a cryptographic hash of the previous block, a timestamp, and transaction data. Since each block contains information about the previous block, the blocks form a chain with each additional block linking to the ones before it. Transactions are submitted to the blockchain with a signature over a secret key such that verifiers can review the transaction and signature and verify the signature based on a public key. Once verified, the transactions are added to the transaction data of a block.

SUMMARY

In some aspects, the techniques described herein relate to a method including: receiving, by at least one processor, from a keyless account service in response to an authentication request, a keyless account service signature including a cryptographic signature, the cryptographic signature being configured to sign over a user identifier, a managing application identifier of a managing application, a nonce and to-be-revealed data; wherein the managing application is configured for managing activities by the user on a blockchain; wherein the nonce is populated with at least one public key associated with the authentication request; wherein the to-be-revealed data is associated with the authentication request; generating, by the at least one processor, for a particular activity, an activity signature including a second cryptographic signature based at least in part on the keyless account service signature and at least one to-be-revealed data field associated with the to-be-revealed data; wherein the at least one to-be-revealed data field is configured to be populated with the to-be-revealed data representative of to-be-revealed information associated with the authentication request; and submitting, by the at least one processor to the blockchain, the particular activity with the activity signature and the to-be-revealed information; wherein the blockchain is configured to validate the particular activity based at least in part on validating the activity signature using: the at least one public key to verify the activity signature based at least in part on: the keyless account service signature and the at least one to-be-revealed data field; and wherein the validating of the activity signature causes at least one operation on the blockchain to be performed based at least in part on the to-be-revealed information having been validated.

In some aspects, the techniques described herein relate to a method, further including: wherein the activity signature includes a zero-knowledge proof of knowledge (ZKPoK) including a zero-knowledge relation applied to at least one secret input including the keyless account service signature; wherein the at least one to-be-revealed data field includes a public input to the zero-knowledge relation of the ZKPoK; and wherein, for the particular activity, the blockchain is configured to validate the ZKPoK of the keyless account service signature and the at least one to-be-revealed data field based at least in part on the at least one secret input and the zero-knowledge relation.

In some aspects, the techniques described herein relate to a method, further including obtaining, by the at least one processor, the ZKPoK of the keyless account service signature using at least one zero-knowledge proving service.

In some aspects, the techniques described herein relate to a method, wherein the activity signature is based at least in part on an ephemeral to-be-revealed key.

In some aspects, the techniques described herein relate to a method, wherein the activity signature is based at least in part on an expiration date defining a time at which the ephemeral to-be-revealed key is configured to expire.

In some aspects, the techniques described herein relate to a method, wherein the at least one to-be-revealed data is omitted from the at least one to-be-revealed data field.

In some aspects, the techniques described herein relate to a method, wherein the blockchain is configured to provide the to-be-revealed information to at least one entity to perform at least one fraud risk assessment.

In some aspects, the techniques described herein relate to a non-transitory computer-readable medium having software instructions stored thereon, wherein the software instructions, upon execution, are configured to cause at least one processor to perform a method including: receiving, from a keyless account service in response to an authentication request, a keyless account service signature including a cryptographic signature, the cryptographic signature being configured to sign over a user identifier, a managing application identifier of a managing application, a nonce and to-be-revealed data; wherein the managing application is configured for managing activities by the user on a blockchain; wherein the nonce is populated with at least one public key associated with the authentication request; wherein the to-be-revealed data is associated with the authentication request; generating for a particular activity, an activity signature including a second cryptographic signature based at least in part on the keyless account service signature and at least one to-be-revealed data field associated with the to-be-revealed data; wherein the at least one to-be-revealed data field is configured to be populated with the to-be-revealed data representative of to-be-revealed information associated with the authentication request; and submitting, to the blockchain, the particular activity with the activity signature and the to-be-revealed information; wherein the blockchain is configured to validate the particular activity based at least in part on validating the activity signature using at least one to-be-revealed key to generate a validating activity signature based at least in part on the keyless account service signature and the at least one to-be-revealed data field; and wherein the validating the activity signature causes at least one operation on the blockchain to be performed based at least in part on the to-be-revealed information having been validated.

In some aspects, the techniques described herein relate to a non-transitory computer-readable medium, wherein the activity signature includes a zero-knowledge proof of knowledge (ZKPoK) including a zero-knowledge relation applied to at least one secret input including the keyless account service signature; wherein, for the particular activity, the blockchain is configured to validate the ZKPoK of the keyless account service signature and the at least one to-be-revealed data field based at least in part on the at least one secret input and the zero-knowledge relation; and wherein the at least one to-be-revealed data field includes a public input to the zero-knowledge relation of the ZKPoK.

In some aspects, the techniques described herein relate to a non-transitory computer-readable medium, wherein the method further includes obtaining the ZKPoK of the keyless account service signature using at least one zero-knowledge proving service.

In some aspects, the techniques described herein relate to a non-transitory computer-readable medium, wherein the activity signature is based at least in part on an ephemeral to-be-revealed key.

In some aspects, the techniques described herein relate to a non-transitory computer-readable medium, wherein the activity signature is based at least in part on an expiration date defining a time at which the ephemeral to-be-revealed key is configured to expire.

In some aspects, the techniques described herein relate to a non-transitory computer-readable medium, wherein the to-be-revealed data is omitted from the at least one to-be-revealed data field.

In some aspects, the techniques described herein relate to a non-transitory computer-readable medium, wherein the blockchain is configured to provide the to-be-revealed information to at least one entity to perform at least one fraud risk assessment.

In some aspects, the techniques described herein relate to a system including: at least one processor in communication with at least one non-transitory computer readable medium having software instructions stored thereon, wherein the at least one processor, upon execution of the software instructions, is configured to perform a method including: receiving, from a keyless account service in response to an authentication request, a keyless account service signature including a cryptographic signature, the cryptographic signature being configured to sign over a user identifier, a managing application identifier of a managing application, a nonce and to-be-revealed data; wherein the managing application is configured for managing activities by the user on a blockchain; wherein the nonce is populated with at least one public key associated with the authentication request; wherein the to-be-revealed data is associated with the authentication request; generating, for a particular activity, an activity signature including a second cryptographic signature based at least in part on the keyless account service signature and at least one to-be-revealed data field associated with the to-be-revealed data; wherein the at least one to-be-revealed data field is configured to be populated with the to-be-revealed data representative of to-be-revealed information associated with the authentication request; and submitting, to the blockchain, the particular activity with the activity signature and the to-be-revealed information; wherein the blockchain is configured to validate the particular activity based at least in part on validating the activity signature using at least one to-be-revealed key to generate a validating activity signature based at least in part on the keyless account service signature and the at least one to-be-revealed data field; and wherein the validating go the activity signature causes at least one operation on the blockchain to be performed based at least in part on the to-be-revealed information having been validated.

In some aspects, the techniques described herein relate to a system, wherein the activity signature includes a zero-knowledge proof of knowledge (ZKPoK) including a zero-knowledge relation applied to at least one secret input including the keyless account service signature; wherein, for the particular activity, the blockchain is configured to validate the ZKPoK of the keyless account service signature and the at least one to-be-revealed data field based at least in part on the at least one secret input and the zero-knowledge relation; and wherein the at least one to-be-revealed data field includes a public input to the zero-knowledge relation of the ZKPoK.

In some aspects, the techniques described herein relate to a system, wherein the method further includes obtaining the ZKPoK of the keyless account service signature using at least one zero-knowledge proving service.

In some aspects, the techniques described herein relate to a system, wherein the activity signature is based at least in part on an ephemeral to-be-revealed key; and wherein the activity signature is based at least in part on an expiration date defining a time at which the ephemeral to-be-revealed key is configured to expire.

In some aspects, the techniques described herein relate to a system, wherein the at least one to-be-revealed data is omitted from the at least one to-be-revealed data field.

In some aspects, the techniques described herein relate to a system, wherein the blockchain is configured to provide the to-be-revealed information to at least one entity to perform at least one fraud risk assessment.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
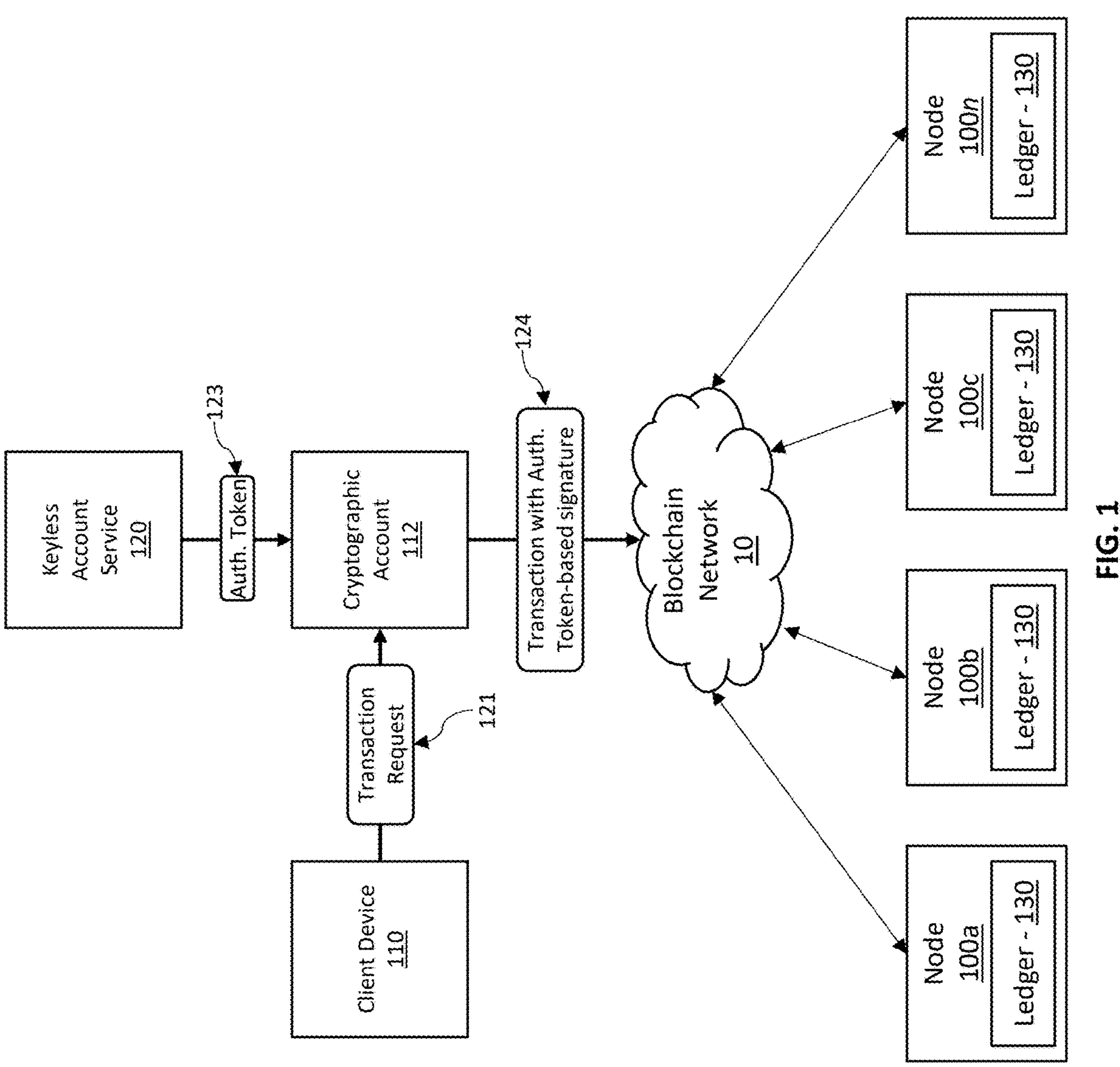
FIG. 1 depicts a network of nodes on a blockchain that leverage a keyless account service for signing transactions on the blockchain in accordance with one or more embodiments of the present disclosure.

Various detailed embodiments of the present disclosure, taken in conjunction with the accompanying FIGS., are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 8 illustrate systems and methods of selectively revealing verifiable information in blockchain transactions. The following embodiments provide technical solutions and technical improvements that overcome technical problems, drawbacks and/or deficiencies in the technical fields involving blockchain security regarding the security of cryptographic keys used for signing transactions, as well as security and limited functionalities of transactions and the blockchain network due to information being hidden from the blockchain. In particular, many operations and/or tasks associated with acting on transactions require information about users, the transaction, and other additional information. However, blockchain networks typically hide information by using cryptographic keys to sign transactions and wallet addresses to define the transaction parameters. Thus, the users involved, and any data related thereto is hidden, preventing operations and tasks such as know-your-customer, fraud risk analysis, post-transaction processing (e.g., issuing receipts, mailing and delivery of transaction-related material, et.). As explained in more detail, below, technical solutions and technical improvements herein address the aforementioned problems by modifying the consensus mechanisms of the blockchain network to use an extra field in transaction data, paired with keyless access service authentication tokens that authenticate the additional information such that one or more signatures and/or zero-knowledge proofs may be verified to validate the additional information. As a result, the additional information may be parsed from the extra field and used as input to enable further operations and/or tasks that would ordinarily not be possible. Based on such technical features, further technical benefits become available to users and operators of these systems and methods. Moreover, various practical applications of the disclosed technology are also described, which provide further practical benefits to users and operators that are also new and useful improvements in the art.

Referring now to FIG. 1, a network of nodes on a blockchain that leverage a keyless account service for signing transactions on the blockchain is depicted in accordance with one or more embodiments of the present disclosure.

In some embodiments, nodes **100*a* through 100*n* may participate in a blockchain network 10. In some embodiments, the blockchain network 10 may include a ledger 130 distributed across the nodes 100*a* through 100*n*. The ledger 130 may include a decentralized and/or distributed digital ledger that records transactions across multiple nodes 100*a* through 100*n***, including a cryptographic or other ledger, such as a blockchain ledger. This ensures that the recorded transactions cannot be altered retroactively without the alteration of all subsequent blocks and the consensus of the network.

In some embodiments, the ledger 130 may include a chain of blocks where each block includes a header and a body. In some embodiments, blocks are linked together using cryptographic hashes. The hash of each block is calculated based on its contents and the hash of the previous block, ensuring integrity and immutability. The header includes metadata such as the previous block's hash, a timestamp, and nonce. The body, or payload, may include transaction data including a list of transactions submitted since a previous block.

In some embodiments, the transactions may include a transaction payload that defines inputs, outputs, operations, and a digital signature. Inputs reference previous transaction outputs, and outputs specify the recipient's address and the amount. A transaction may then be validated by one or more nodes **100*a* through 100*n***, as further detailed below, by checking digital signatures, ensuring inputs are unspent, and verifying adherence to protocol rules.

In some embodiments, each node **100*a* through 100*n* may be any device (computer, server, etc.) that participates in the blockchain network 10. Nodes maintain a copy of the ledger 130 and help validate and relay transactions. The collective set of nodes 100*a* through 100*n* ensure the blockchain network 10 integrity and security by following the consensus rules, thus requiring that for a transaction to be performed on the ledger 130, a threshold number of nodes 100*a* through 100*n* agree that the transaction is valid over a signature. Accordingly, in some embodiments, the nodes 100*a* through 100*n* may store the entire ledger 130** and validate all transactions and blocks to ensure the network's security and integrity by independently verifying transactions.

In some embodiments, one or more of the nodes **100*a* through 100*n* may validate some or all transactions. Nodes 100*a* through 100*n*** validate transactions by checking if they adhere to the network's rules (e.g., ensuring the sender, recipient and/or transaction conform to certain criteria). Validating transactions may include verifying signature that sign the transactions to ensure validity.

In some embodiments, one or more of the nodes 100*a* through 100*n* may also or instead validate blocks of the ledger 130. In some embodiments, nodes verify new blocks by using one or more consensus mechanisms and ensuring all transactions within the block are valid. Consensus mechanisms may include one or more protocols used in the blockchain network to achieve agreement on the state of the ledger 130 among the nodes 100*a* through 100*n*. The consensus mechanism(s) ensure that all participants in the network agree on the validity of transactions and the order in which they are added to the blockchain.

In some embodiments, the consensus mechanism(s) may include Proof of Work (PoW), such as in Bitcoin™, Ethereum™ or others. In PoW, the nodes 100*a* through 100*n* (miners) compete to solve a complex mathematical problem. The first to solve may be enabled to add the next block to the ledger 130 and be rewarded with cryptocurrency.

In some embodiments, the consensus mechanism(s) may include Proof of Stake (POS), such as in Ethereum™ 2.0, Cardano™ or others. In some embodiments, PoS may include validators selected from amongst the nodes 100*a* through 100*n* create new blocks based on the number of coins they hold and are willing to "stake" as collateral. The more coins staked, the higher the chance of being selected.

In some embodiments, the consensus mechanism(s) may include Delegated Proof of Stake (DPOS), such as in EOS™, TRON™ or others. In DPOS, nodes 100*a* through 100*n* associated with coin holders vote for a small number of delegates who are responsible for validating transactions and creating new blocks.

In some embodiments, the consensus mechanism(s) may include Practical Byzantine Fault Tolerance (PBFT), such as in Hyperledger Fabric, Zilliqa, or others. In some embodiments, in PBFT, nodes 100*a* through 100*n* communicate with each other to agree on the state of the blockchain. A block is added when a supermajority (e.g., two-thirds) of nodes 100*a* through 100*n* agree.

In some embodiments, the consensus mechanism(s) may include Proof of Authority (PoA), such as in VeChain, POA Network or others. In some embodiments, in PoA, a limited number of pre-approved nodes 100*a* through 100*n*, termed validators or authorities, create new blocks. Validators are chosen based on their identity and reputation.

In some embodiments, the consensus mechanism(s) may include Proof of Burn (PoB), such as in Slimcoin™ among others. In some embodiments, in PoB, users associated with nodes 100*a* through 100*n* "burn" (destroy) a certain amount of cryptocurrency to gain the right to mine or validate transactions. This demonstrates their commitment to the network.

In some embodiments, the consensus mechanism(s) may include Proof of Capacity (PoC), such as in Burstcoin™ among others. In some embodiments, in PoC nodes 100*a* through 100*n* may allocate hard drive space to solve a cryptographic challenge. The more space allocated, the higher the chance of mining a block.

In some embodiments, the consensus mechanism(s) may include Proof of Elapsed Time (PoET), such as in Hyperledger Sawtooth™ among others. In some embodiments, in PoET, nodes 100*a* through 100*n* may wait for a randomly assigned time before creating a new block. The first to finish waiting gets to add the block.

In some embodiments, the nodes 100*a* through 100*n* may communicate with each other over the blockchain network 10, e.g., using a peer-to-peer (P2P) network, though other networks may be employed. Indeed, in some embodiments, the blockchain network 10 may include any one or more suitable network types, such as, e.g., a computer network including a local-area network (LAN), a wide-area network (WAN) or other suitable computer network using any of one or more networking protocols. In some embodiments, a LAN may connect computers and peripheral devices in a physical area by means of links (wires, Ethernet cables, fiber optics, wireless such as Wi-Fi, etc.) that transmit data. In some embodiments, a LAN may include two or more personal computers, printers, and high-capacity disk-storage devices, file servers, or other devices or any combination thereof. LAN operating system software, which interprets input and instructs networked devices, may enable communication between devices to share the printers and storage equipment, simultaneously access centrally located processors, data, or programs (instruction sets), and other functionalities. Devices on a LAN may also access other LANs or connect to one or more WANs. In some embodiments, a WAN may connect computers and smaller networks to larger networks over greater geographic areas. A WAN may link the computers by means of cables, optical fibers, or satellites, cellular data networks, or other wide-area connection means. In some embodiments, an example of a WAN may include the Internet. This decentralized communication ensures that there is no single point of failure and that the network remains robust and secure.

In some embodiments, upon transactions and blocks being validated, a new block may be added to the ledger 130 via a cryptographic hash of the previous block, a timestamp, and transaction data specifying the validated transactions submitted since the last block. Hashing ensures the integrity and immutability of the blockchain.

In some embodiments, as detailed above, a client device 110 may use a cryptographic account 112 to submit a transaction to the ledger 130 for validation, including validation based on a signature using one or more keys. Typically, such signatures may be made using a key pair where the transaction details are signed over a secret (or "private") key such that validators may validate the signature using a public key paired to the secret key. However, secret keys can be lost, forgotten, stolen, and are generally cumbersome to use and maintain. Accordingly, embodiments herein may include a keyless account service 120 that validates an identity of the user accessing the cryptographic account 112 via the client device 110, and issues an authentication token 123 in response. Such authentication token 123 may then be used to sign transactions. Thus, a user at the client device 110, when creating a transaction request 121, may authenticate with the keyless account service 120 to obtain an authentication token 123 for the transaction request 121, and then sign the transaction payload of the transaction request 121 using the authentication token 123. As a result, a user may submit a transaction with an authentication token-based signature 124 to the ledger 130 without needing to maintain a secret key that could otherwise be compromised or lost, thus improving the security and useability of the ledger 130.

In some embodiments, the authentication token 123 and the authentication token-based signature 124 can be leveraged to enable the selective revelation of information while maintaining the verifiability of the authenticity of the information. In some embodiments, the transaction may include one or more optional fields that can be matched to attributes of the authentication token 123. As a result, by verifying the attributes of the authentication token 123, e.g., via a signature over the authentication token 123, the to-be-revealed information of the optional field may be verified when the to-be-revealed information is shown to be present in the authentication token 123. For example, an email address associated with the User ID field of the authentication token 123 may be used to populate the optional field which can be shown to be valid when the User ID field of the authentication token 123 matches to the email address of the optional field and the signature over the authentication token 123 validates the authentication token 123.

In some embodiments, the optional field can be populated with any information that would be present in the attributes of the authentication token 123, or may include additional or other information that can be embedded in the authentication token 123 such as in a new field of the authentication token and/or as a portion of a field of the authentication token 123. As a result, the optional field can be verifiable against the authentication token 123 thus enabling the publishing of information that can be verified as authentication. Such verifiable published information can be used for downstream processes that rely on accurate information, such as fraud analysis, know-your-customer checks, among other use cases or any combination thereof.

Figure 2:
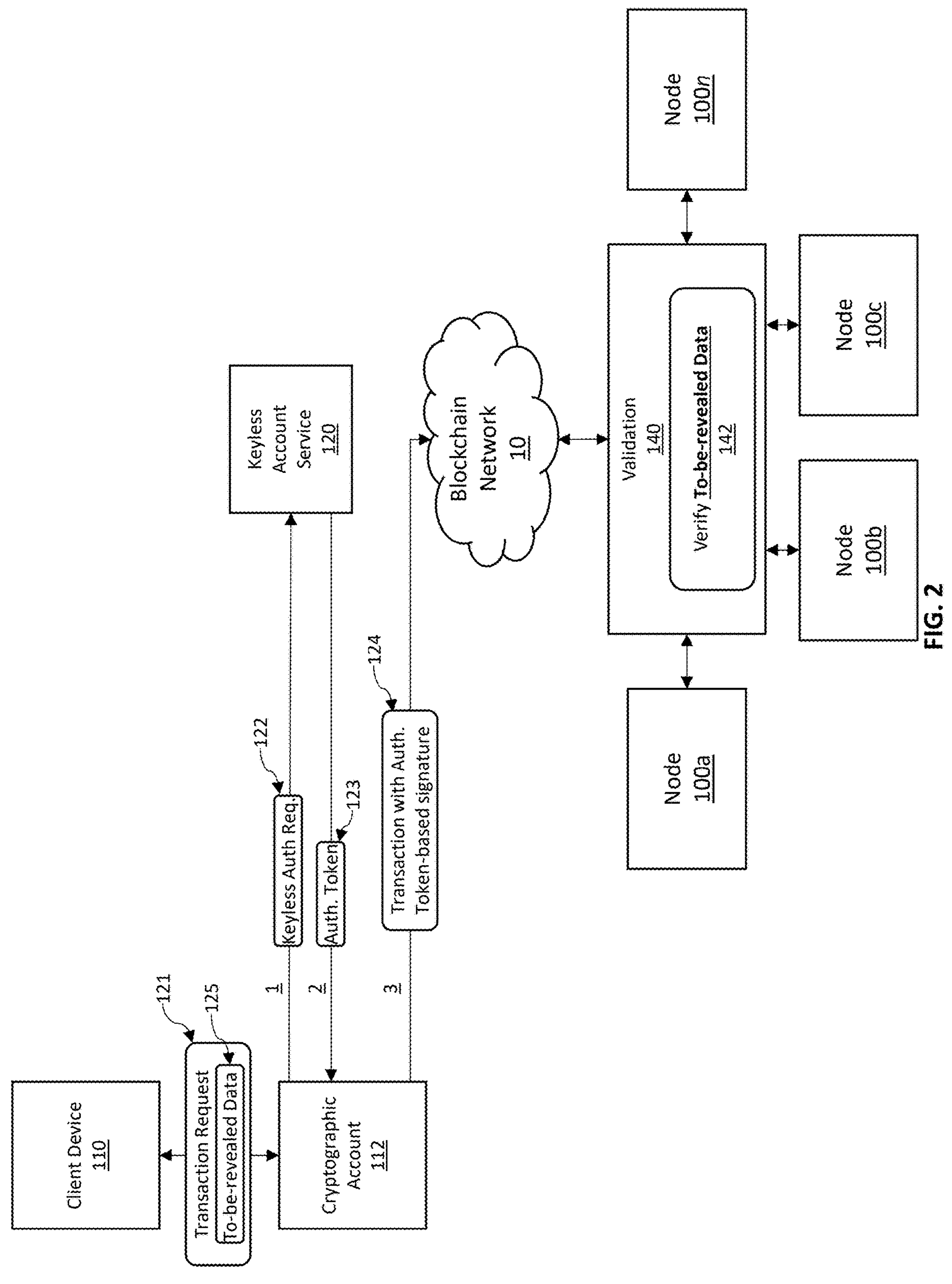
FIG. 2 depicts an exemplary node configured to selectively reveal information using authentication tokens provided by a keyless account service and a blockchain configured to verify the information based on the authentication token in accordance with one or more embodiments of the present disclosure.

Referring now to FIG. 2, an exemplary node configured to selectively reveal information using authentication tokens provided by a keyless account service and a blockchain configured to verify the information based on the authentication token is depicted in accordance with one or more embodiments of the present disclosure.

In some embodiments, the client device 110 may include at least one of, without limitation, a personal computer (PC), laptop computer, tablet, touch pad, portable computer, handheld computer, palmtop computer, personal digital assistant (PDA), smartphone, smartwatch, cellular telephone, combination cellular telephone/PDA, smart television, mobile internet device (MID), messaging device, data communication device, and so forth.

In some embodiments, a user may, via the client device 110, define and request a transaction on the blockchain network 10. Herein, the term "transaction" or "blockchain transaction" refers to any blockchain-based activity, including, without limitation, an operation performed on a quantity of data such as transfer of the quantity of data, a delete or add (e.g., "burn" or "mint") of the quantity of data, a change to the data or the quantity of the data, or any other operation or any combination thereof. Accordingly, a transaction may be defined by a transaction payload specifying, e.g., one or more participant identifiers (ID) (e.g., a first address associated with a cryptographic account holding the quantity of data, a second address associated with a cryptographic account receiving the quantity of data, etc.), an operation, the quantity, a type of the data (e.g., one or more tokens), metadata associated with the data, one or more identifiers associated with the data, a timestamp of the transaction, a transaction identifier (ID), among other transaction data or any combination thereof to represent the data, quantity, operation and participants of a transaction.

In some embodiments, the cryptographic account 112 provides the participant identification in the form of an address, e.g., a blockchain address. The address is a unique identifier on the blockchain network 10, such as a unique string of alphanumeric characters. The address may be derived from cryptographic information include a cryptographic key such as a public key associated with the cryptographic account 112. In some embodiments, the cryptographic account 112 is used to sign transactions based on an address on the ledger 130 such that transactions are immutably bound to the cryptographic account 112.

In some embodiments, as is described in greater detail below, the address of the cryptographic account 112 may be derived from keyless account authentication information rather than a public key in order to allow for keyless sign-on via the keyless account service 120. In some embodiments, the address of the cryptographic account 112 may be a hash of a user identifier, and an account identifier associated with the cryptographic account 112, among other parameters, such as a privacy-preserving pepper, a salt, a nonce, or other inputs or any combination thereof.

In some embodiments, the cryptographic account 112 may be identified by its address, under which an authentication key of the cryptographic account 112 is stored. The authentication key is a cryptographically binding commitment to the cryptographic account 112 public key (PK) (e.g., a hash of the PK). Typically, the PK may be part of a key pair, e.g., derived from a master seed, where the owning user of the cryptographic account 112 manages the corresponding secret key. Thus, typically, to authorize access to the cryptographic account 112, a transaction includes a digital signature and the PK committed to the authentication key under the cryptographic account 112 address, where the digital signature is over the address of the cryptographic account 112 and the transaction payload (e.g., a Move entry function call or other transaction function call or any combination thereof). To verify that a transaction is authorized to access the cryptographic account 112, typically each validator (e.g., nodes **100*b* through 100*n*) may fetch the public key from the transaction, derive the authentication key, check whether the derived authentication key is equal to the authentication key stored under the address of the cryptographic account 112**, and test the signature as to whether it verifies under a hash of the transaction using the fetched public key.

However, as detailed above, such an arrangement requires that the user manage the secret key, which is often a complex alphanumeric, hexadecimal or other format string that is easily lost, forgotten, stolen, mistaken, or otherwise compromised. Accordingly, the cryptographic account 112 may be configured to use a keyless account service 120 to provide an authentication token, to be used in place of a traditional PK, such that the cryptographic account 112 may sign transactions based on the authentication token. Thus, in some embodiments, to improve security and ease of use, the cryptographic account 112 may communicate with the keyless account service 120 to obtain authentication information for use in signing a transaction in place of the PK and/or secret key. Accordingly, the cryptographic account 112 may sign transactions without requiring a master seed, private key or public key. Instead, the signing may leverage authentication of the user's identity via the keyless account service 120.

To do so, in some embodiments, the user may interface with the client device 110 to define a transaction request 121 requesting the cryptographic account 112 to perform a transaction on the blockchain network 10. The transaction request 121 may include the transaction payload, including or accompanied by to-be-revealed data 125. In some embodiments, the user may have information that they wish to be revealed on the blockchain network in a verifiable manner, e.g., to satisfy know-your-customer requirements or other purpose. Thus, the to-be-revealed data 125 may be a part of the transaction request 121 such that it is incorporated into the transaction signing and validation processes to verify to the blockchain network 10 the veracity of the to-be-revealed data 125. In some embodiments, to facilitate verifiability of the to-be-revealed data 125, the to-be-revealed data 125 may be associated with one or more attributes of the authentication token 123. For example, the to-be-revealed data 125 may be a value of a particular or selected field in the authentication token 123, a portion of a value in a particular or selected field of the authentication token 123, derived from one or more values of one or more fields in the authentication token 123 or portions thereof, or any combination thereof.

In some embodiments, upon receiving the transaction request 121, the cryptographic account 112 may authenticate the user by submitting a keyless authentication request 122 at step 1 to the keyless account service 120. The keyless account service 120 may include one or more hardware and/or software components for performing keyless authentication on behalf of the user. An example of a keyless account service 120 is an OpenID Connect provider as per OAuth standards, though other entities, hardware and/or software may be used instead or in addition. For example, the keyless account service 120 may include a hardware authentication device such as a YubiKey™. Any other hardware and/or software components may be employed to authenticate a request against known credentials such that an authentication token may be issued in response.

In some embodiments, the keyless authentication request 122 may include data to be authenticated, which may include identity-related data as well as any additional data including the to-be-revealed data 125. Indeed, the keyless authentication request may provide a user identifier, application identifier, client identifier, password, among other identity-related information associated with the credentials at the keyless account service 120. Thus, the keyless account service 120 may test such identity-related information against the authentic information of the identity.

Upon authentication at the keyless account service 120, the keyless account service 120 may return, at step 2, an authentication token 123. The authentication token 123 may include the data provided in the keyless authentication request 122 (e.g., as a payload), and a signature that signs over the data. Thus, the authentication token 123 may include cryptographic information including a signature over attributes of the authentication, such as, e.g., a user identifier, an account identifier, an application identifier, a client identifier, a time, an expiration period, transaction data, one or more cryptographic keys, and/or the to-be-revealed data 125, among other attributes or any combination or hash thereof. In some embodiments, the to-be-revealed data 125 may be selected from existing fields of the authentication token 123, and thus the to-be-revealed data 125 may not be a separate or discrete item of the authentication token 123, but instead may be data specified based on the authentication token 123.

In some embodiments, a user identifier may include any identifying information associated with a user, such as a username, an email address, a phone number, a mailing address, a social media profile, among other data or any combination thereof.

In some embodiments, an account identifier may include any identifying information identifying an account, such as a credit card number, bank account, cryptographic account address, among other account identifiers or any combination thereof.

In some embodiments, an application identifier may include data identifying an application, such as the application managing the cryptographic account 112 on the client device 110. The application identifier may include, e.g., an identifier assigned to uniquely identify the application, such as by a development platform, security service, application store, developer, etc., e.g., by random assignment, logic-based derivation based on attributes of the application, cryptographic hashing of attributes of the application, as well as other methods or any combination thereof.

In some embodiments, a client identifier may uniquely identify the client device 110, such as a serial number, model number, part number, MAC address, IP address, logic-based derivation based on attributes of the client device 110, cryptographic hashing of attributes of the client device 110 or other identifier or any combination thereof.

In some embodiments, a time may include a time and/or date at which the authentication request was created by the client device 110 and/or received by the keyless account service 120, or a time and/or date at which the authentication token was generated and/or sent by the keyless account service 120.

In some embodiments, an expiration period may include a period of time for which the authentication token is valid, such as, e.g., one minute, two minutes, three minutes, four minutes, five minutes, ten minutes, fifteen minutes, twenty minutes, thirty minutes, one hour, one day, or more.

In some embodiments, transaction data may include some or all of the data defining the transaction, including the transaction payload, such as operation or function call, participant information (e.g., source address, destination address, etc.), among other data or any combination thereof, or any hash of any combination thereof.

In some embodiments, while the to-be-revealed data 125 may be data selected from pre-existing fields of the authentication token 123 (e.g., data populating standards-based fields such as the fields of a JSON web token), the authentication request may also or instead be adapted to specify additional data, such as the to-be-revealed data 125 that the user may wish or be required to submit with the transaction to be revealed and validated. Accordingly, the application managing the cryptographic account 112 may append the to-be-revealed data 125 to the keyless authentication request 122 as an additional value in a pre-existing field or as a separate field. As a result, upon authentication, the keyless account service 120 may return the authentication token 123 with an authentication token signature over the authentication request data including the to-be-revealed data 125, thus committing the to-be-revealed data 125 within the authentication token signature.

In some embodiments, to facilitate validation of the signature of the authentication token 123, the authentication token 123 may also include cryptographic information, such as cryptographic operations applied to the attributes. For example, the authentication token may specify a cryptographic algorithm such as, e.g., HMAC with SHA-256 (HS256), RSA signature with SHA-256 (RS256). JWA (JSON Web Algorithms) RFC 7518 among others or any combination thereof.

For example, the authentication token 123 may include a WebAuthn compliant JSON web token (JWT) having a header, a payload and a signature over the header and/or payload. In some embodiments, the header may specify the cryptographic operations applied to the JWT, including, e.g., the signing and/or decryption technique used (such as, without limitation, SHA-256 (HS256) and RSA signature with SHA-256 (RS256). JWA (JSON Web Algorithms) RFC 7518 among others or any combination thereof). It can also contain the data about the media/content type of the information we are sending. In some embodiments, the payload may include standard and/or custom fields defining claims. Examples of the standard fields may include, e.g., issuer ("iss"), subject ("sub"), audience ("aud"), expiration time ("exp"), not before ("nbf"), issued at ("iat"), JWT ID ("jti"), nonce ("nonce"), etc. In some embodiments, the keyless account service 120 and/or client device 110 may be configured to apply additional and/or alternative custom fields, such as, e.g., a user identifier ("uid"), among others or any combination thereof.

In some embodiments, the to-be-revealed data 125 may include the data populating one or more of the JWT payload fields such that the signature over the JWT payload may be used to authenticate the to-be-revealed data 125. Thus, authentication via the keyless account service 120 may be leveraged to further authenticate particular items of data that would ordinarily be hidden on the blockchain.

In some embodiments, the cryptographic account 112 may employ the authentication token 123 and/or the attributes/values thereof as the public key. As a result, instead of having a secret key, the user's ability to sign into the keyless account service 120, via the application managing the cryptographic account 112, to obtain the authentication token 123, e.g., using a user identifier and password or other authentication mechanism, may serve as the secret key. Indeed, the transaction data define parameters that must be proven in order for the transaction to be validated. Thus, the transaction data may include that which can validate the authentication token and therefore the cryptographic account 112 to which the authentication token has been issued.

As a result, if a user can successfully use the application identified in the keyless authentication request 122 and/or authentication token 123 to sign in to the user's account with the keyless account service 120, e.g., identified by user identifier key and/or value fields and issued by the keyless account service 120 identified in the authentication token 123, then that ability acts as that users' "secret key." For example, in the context of an authentication token including a JWT, the user signs in to an OAuth/OpenID authentication mechanism (e.g., OpenID Connect provider) using a user identifier, password and a registered application. Thus, the user may sign in to the OAuth/OpenID authentication mechanism using a user identifier (e.g., an email address, username, etc.), a password and the application identifier associated with the application managing the cryptographic account 112. In return, upon authentication, the OAuth/OpenID authentication mechanism may provide a JWT having in its payload a uid specifying the user identifier, an aud specifying the application identifier, and an iss specifying the OAuth/OpenID authentication mechanism, and thus the uid value, the aud value and iss value may act as the user's secret key.

In some embodiments, the cryptographic account 112 may be used to submit a transaction with an authentication token-based signature 124 at step 3 to the ledger 130 using the authentication token. The payload and the signature of the authentication token provide provable parameters of the transaction. Thus, a validator may validate the transaction where the validator can create a derived authentication token signature based on the header information and the payload and verify against the actual authentication token signature. For example, the cryptographic account 112 may submit the transaction with the authentication token-based signature 124 defining transaction parameters, the authentication token header with the cryptographic algorithm used, the authentication token payload (including, e.g., the user identifier, the application identifier, a nonce, among other data or any combination thereof, such as additional, to-be-revealed data as detailed above that the user may wish to submit to, reveal and validate on the ledger 130), and the authentication token signature, along with a transaction signature that signs over the transaction parameters, the authentication token header with the cryptographic algorithm used, the authentication token payload, and the authentication token signature using a keyless account-based address.

In some embodiments, the keyless account-based address may be derived from the authentication token so as to ensure that only the holder of the authentication token can sign transactions. For example, the keyless account-based address may be derived from a hash of data from the keyless account-based address, such as the keyless account service identifier, user identifier, application identifier, etc. Moreover, to further protect the privacy of the user's identity, the user identifier and application identifier (among other data) may be hidden within an identity commitment that hashes the user identifier and application identifier (among other data). The identity commitment and the keyless account service identifier may then be committed within the keyless account-based address by hashing the identity commitment and the keyless account service identifier to create the keyless account-based address with which the transaction may be signed.

For example, for an authentication token 123 including a JWT, a public key may be created as the iss (the OAuth/OpenID authentication mechanism identifier, e.g., an OIDC provider identifier), together with an identity commitment formed form a hash of the user identifier, and the application identifier (e.g., identity commitment=H' (uid_key,uid_val, aud_val;r), where r←$ {0,1}256). Accordingly, the authentication key may be derived as a hash of the iss and the identity commitment (e.g., auth_key=H(iss_val,addr_idc)).

Thus, to validate the transaction, a validator may fetch the identity commitment and the keyless account service identifier from the transaction and derive its expected keyless account-based address. The validator may also check that this derived expected keyless account-based address equals the keyless account-based address stored under the address of the cryptographic account 112 and that the transaction signature verifies under the fetched identity commitment and keyless account service identifier over the transaction. As a result, without a public key or secret key, the cryptographic account 112 may sign and submit a transaction such that validators (e.g., nodes 100*a* through 100*n*) may validate the transaction based on the signature thereof.

In some embodiments, to bind the authentication token to the transaction such that the authentication token cannot be reused, particularly because, as detailed above, the header, payload and signature thereof all are revealed, the cryptographic account 112 may authentication with the keyless account service 120 using the transaction or a hash thereof. For example, the authentication request may include as a nonce a hash of the transaction. Thus, upon authenticating the cryptographic account 112, the keyless account service 120 may sign over the transaction hash. As such, validating the transaction signature requires the particular transaction data committed with the transaction hash provided to the keyless account service 120.

However, in some embodiments, binding the authentication token to the particular transaction would require a user to sign in to the keyless account service 120 for every transaction. Thus, in some embodiments, the application managing the cryptographic account 112 may generate an ephemeral public key which may be provided to the keyless account service 120, e.g., in a nonce field of the keyless authentication request 122. As a result, the signature of the authentication token 123 is generated over the ephemeral public key. The cryptographic account 112 may then generate an ephemeral signature over the transaction by signing the transaction and/or a hash thereof with the ephemeral public key. In doing so, a validator may verify the ephemeral signature by fetching the ephemeral public key from the transaction and creating a derived ephemeral signature. Moreover, by including the ephemeral public key in the nonce of the authentication request, the authentication token signature can only be verified with the correct ephemeral public key in the transaction. Thus, the authentication token 123 may be bound to the transaction without revealing transaction data to the keyless account service 120.

In some embodiments, the ephemeral public key may also be accompanied by an expiration period, such as an expiration date, a maximum epoch, or other definition of a time period. The expiration period may be provided in the keyless authentication request 122 such that upon authentication, the keyless account service 120 signs over the expiration period in addition to the ephemeral public key such that the authentication token signature becomes invalid upon expiration of the expiration period. Indeed, the expiration period may also be included in the transaction such that validators at validation 140 may verify that the ephemeral public key is not expired.

In some embodiments, where the ephemeral public key, ephemeral public key signature and expiration date are all employed, the transaction data may include the user identifier, the authentication token payload, the authentication token header, the ephemeral public key, ephemeral public key signature and expiration date. As such, validation 140 may perform signature verification against the keyless account service identifier and the identity commitment to verify the transaction data and the to-be-revealed data 125.

In particular, the validation 140 may include assert that the identity commitment is equal to a hash of user ID key, user ID value and client ID based on the authentication token 123 in order to verify the keyless account-based address of the transaction. Additionally, the validation 140 may verify that a public key formed from the keyless account service identifier and the identity commitment matches the keyless account-based address on-chain by asserting that the keyless account-based address is to be shown as equal to a hash of keyless account service identifier and identity commitment.

In some embodiments, the validation 140 may include verifying a signature over the ephemeral key. In particular, the transaction data may be signed using the ephemeral public key to produce an ephemeral signature over the transaction. Thus, the validation 140 may derive the public hash inputs for the ephemeral signature and create a derived ephemeral signature using the ephemeral public key provided in the transaction data. The ephemeral signature can be tested against the derived ephemeral signature to validate the transaction data.

In some embodiments, to further validate the transaction, the validation 140 may include fetching a public key published by the keyless account service 120, which may be identified via a key identifier field in the authentication token header. Using the public key of the keyless account service 120, the validation 140 may verify the keyless account service 120 signature under the keyless account service public key over the authentication token header and authentication token payload. In some embodiments, this step verifies the authentication token signature requires that validators agree on the latest authentication tokens (e.g., public keys) of the keyless account service 120, which may publish them, e.g., at a particular URL. In some embodiments, because the to-be-revealed data 125 is provided in the keyless authentication request 122 and thus part of the authentication token 123 payload, the to-be-revealed data is verified by verifying the authentication token signature.

In some embodiments, as detailed above, the user may desire or be required to reveal additional information, the to-be-revealed data 125, for example to enable further operations on the blockchain network based on the additional information. Thus, the public information, provided in the transaction data, may include the to-be-revealed data 125. Indeed, the transaction data may include an "extra field" associated with providing the to-be-revealed data 125. In some embodiments, the extra field may be assigned a certain type of data, such as a user identifier, user contact information, name, location, address, terms of the transaction (e.g., for a contract or agreement), among other data types or any combination thereof. Alternatively, or in additional, the extra field may be assigned no type of data such that the user may populate the extra field with any information.

In some embodiments, in order for the to-be-revealed data 125 to be verified, the to-be-revealed data 125 may be matched to information within the authentication token payload. For example, the additional field may be populated with user data that would ordinarily be private or otherwise omitted from the transaction data but is specified in the authentication token 123 and, resultingly, signed over by the keyless account service 120. But in some scenarios, the user may wish to reveal such information. Thus, the user may include the user data in the extra field of the transaction data as well as a custom check name of the authentication request and/or authentication token. Thus, because the user data is included as a parameter of the authentication token payload, the extra field may be proven via the authentication token signature and the contents of the authentication token payload.

In some embodiments, the extra field may be matched to a standard check name in the authentication token payload (e.g., including those detailed above), or may be in a custom check name field of the authentication token payload. To match the extra field to such check name in the authentication token payload, the extra field may include a key and value, where the key may be set to be the key of the associated check name in the authentication token payload, and the value is set to be the associated to-be-revealed data 125. Accordingly, validation 140 may, via the authentication token signature, include verifying that the extra field value is to be shown to be the authentication token payload value associated with the extra field key. For example, in the OAuth/OpenID authentication mechanism, the to-be-revealed data 125 may be a mailing address, thus the extra field key may be set to be a custom mailing address key with the custom mailing address value such that on validation 140 it is asserted that extra_field_val is to be shown to be jwt[extra_field_key].

In some embodiments, the above transactions include the user identifier and authentication token payload, which reveals user information to the blockchain network 10. Accordingly, to further improve security and confidentiality, the transaction may be based on zero-knowledge signatures. Thus, instead of the user identifier, authentication token payload and authentication token signature, the transaction may include the authentication token header, the ephemeral public key, the ephemeral public key signature, the expiration period, the expiration maximum, and a zero-knowledge proof, where the zero-knowledge proof proves private information including the application identifier, user identifier, authentication token signature, and authentication token payload. Accordingly, in some embodiments, the transaction data itself does not explicitly include identifying user information such as the authentication token payload, authentication token signature or user ID information.

Accordingly, in some embodiments, validators, at validation 140, may validate the transaction signature by checking the expiration date, keyless account-based address, expiration maximum, ephemeral signature and public key of the keyless account service 120 as detailed above, and also derive a public inputs hash hashing the public inputs with a zero-knowledge algorithm, e.g., utilizing one or more of Succinct Non-Interactive ARguments of Knowledge (SNARK), Scalable Transparent ARgument of Knowledge (STARK), Verifiable Polynomial Delegation (VPD), Succinct Non-interactive ARGuments (SNARG), bulletproofs, among others or any combination thereof. Thus, in some embodiments, a validator may fetch the ephemeral public key, identity commitment, ephemeral public key expiration date and expiration maximum, keyless account service identifier, authentication token header, and public key of the keyless account service 120.

In some embodiments, the zero-knowledge proof may argue the existence of a secret input that satisfies a keyless zero-knowledge relation. In some embodiments, the private input, $w_{priv}$, may include, e.g., the client identifier, user identifier, authentication token signature, and authentication token payload. In some embodiments, the public input, $w_{pub}$, may include, e.g., the ephemeral public key (epk), the address commitment, an expiration of the authentication token/epk, an issuer ID of the authentication token (e.g., of the keyless account service 120), the authentication token header, the to-be-revealed data 125 and the public key of the keyless account service, among others or any combination thereof.

In validating the to-be-revealed data 125 in the extra field, the to-be-revealed data 125 may be validated such that additional operations may rely on the additional information. Such additional operations may include, e.g., conducting a know-your-customer (KYC) analysis based on provided identifying information of the user. Another example may include automatically communicating a receipt or other documentation of the transaction upon validation 140 based on to-be-revealed data 125 including contact information provided in the extra field. Another example may include performing fraud risk analysis using to-be-revealed data 125 including identifying information of the user supplied via the extra field. Other operations may be performed, or any combination thereof. As a result, new capabilities are provided to the ledger 130 that otherwise would be impossible to perform due to the anonymity of typical blockchains, which rely on wallet addresses for identification with little other data revealed.

Figure 3:
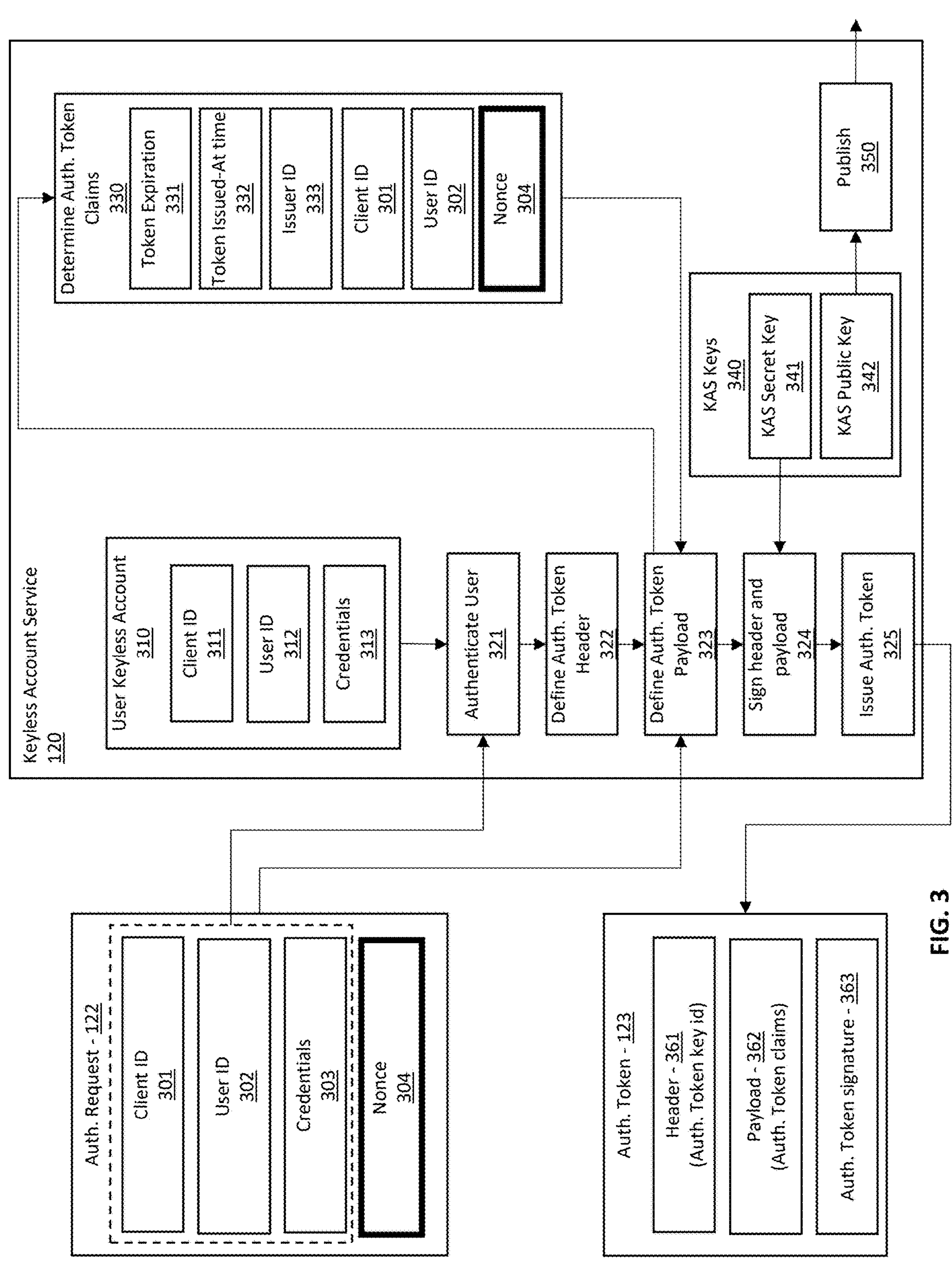
FIG. 3 depicts a keyless account service generating an authentication token for signing a transaction based on an authentication request of a cryptographic account in accordance with one or more embodiments of the present disclosure.

Referring now to FIG. 3, a keyless account service is illustrated generating an authentication token for signing a transaction based on an authentication request of a cryptographic account in accordance with one or more embodiments of the present disclosure.

In some embodiments, the cryptographic account 112 may be managed by a managing application. The managing application be a local software application on the client device 110 or may be a remotely hosted service, or any combination thereof. The cryptographic account 112, via the managing application, may send an authentication request 122 to the keyless account service 120 to authenticate the user and the managing application. In response, upon authentication against the user's account at the keyless account service 120, the keyless account service 120 may return an authentication token 123 that authenticates the identity and the managing application.

In some embodiments, the authentication request 122 may include claims to be authenticated by the keyless account service 120. The claims may include, without limitation, a client ID 301. In some embodiments, the client ID 301 may represents an identifier for the client device 110 associated with the cryptographic account 112, managing application and client device 110 for authenticating the user identity. The claims may include, without limitation, a user ID 302. In some embodiments, the user ID 302 may represents user identifying information for authenticating the user, such as, e.g., an email, a phone number, a username, a passkey, among other representations of identity or any combination thereof. The claims may include, without limitation, credentials 303 associated with authenticating the user's identity, such as, e.g., authentication information such as encryption keys, password, passkey, cryptographic token, among others or any combination thereof.

The claims may include, without limitation, a nonce 304. A nonce is a field that may be populated with randomness or other unique information to the authentication request 122 for increasing security, e.g., by preventing replay attacks. Typically, the nonce 304 may be populated with a unique, random string generated by the client device 110, managing application and/or cryptographic account 112 so as to bind the resulting authentication token 123 to the specific authentication request 122. Here, however, the nonce may be populated with key information specific to this authentication request 122, such as a limited use and/or limited time public key (e.g., an "ephemeral" public key). In populating the nonce 304 with an ephemeral public key specific to the authentication request 122, the authentication token 123 may be bound to the authentication request 122 while also making the ephemeral public key verifiable under the authentication token signature 363, thus enabling the authentication token 123 to authenticate the ephemeral public key. As a result, the ephemeral key may be included such that use of the ephemeral key in signing a transaction associated with the authentication request 122 can be validated by verifying the authentication token signature over the ephemeral key. In some embodiments, the nonce 304 may also include other data, such as a random value/string, one or more policies associated with the ephemeral public key, a counter, a pepper, among others or any combination thereof.

In some embodiments, the authentication request 122 may additionally include one or more claims for other information over which the keyless account service 120 may sign. As with the other claims, by including additional information in one or more claims, the authentication token signature 363 signs over such additional information making later-asserted additional information verifiable over the authentication token signature 363. In some embodiments, the cryptographic account 112 may be configured to match to-be-revealed data that is to be included in the blockchain transaction to one or more claims of the authentication request 122 and/or authentication token 123.

Alternatively or additionally, in some embodiments, the cryptographic account 112 may be configured to create a custom field in the authentication request 122 to be used as the to-be-revealed data. In such embodiments, the cryptographic account 112 may be configured to populate the to-be-revealed data 305 with a default value, such as a null value, a constant, a default message or string, or other default.

Upon defining the transaction, the user may specify information different from the default value that the user wishes to reveal on the blockchain network 10 in a verifiable manner. For example, the user may select to reveal user identifying information, e.g., for know-your-customer checks, fraud checks, etc., or any other information that the user wishes or is required to assert in a verifiable manner. In selecting to reveal the information, the cryptographic account 112 may insert data representative of the information into the to-be-revealed data field(s) to be signed over by the keyless account service 120 for later verification. Thus, the to-be-revealed data may be selectively employed, with the to-be-revealed data and transaction payload defaulting to a default value with the option for a user to define different information.

In some embodiments, the keyless account service 120 may manage a user keyless account 310 for authenticating the user in the use of software applications, such as the cryptographic account 112 and/or a managing application thereof. The keyless account service 120 may authenticate the user 321 based on the application and/or device being used to request authentication, an identity of the user and account credentials. Thus, the keyless account service 120 may test the client ID 301, user ID 302 and credentials 303 against the user keyless account 310, including a client ID 311, user ID 312 and credentials 313 of the user keyless account 310.

In some embodiments, upon authentication, the keyless account service 120 may define an authentication token header 361, an authentication token payload 362 and an authentication token signature 363 based on a signing of the authentication token payload 362 and/or the authentication token header 361. Collectively, these items for the authentication token 123 attesting to the authenticity of the user.

In some embodiments, the keyless account service 120 may define the authentication header at 322. In some embodiments, the authentication token header 361 may include, e.g., the cryptographic protocol for producing the authentication token signature 363, such as the cryptographic function (e.g., hash function), among other parameters for generating the authentication token signature 363. The cryptographic protocol may be, e.g., as in a JSON Web Token, a key ID or kid.

In some embodiments, the keyless account service 120 may define the authentication token payload 362 at 323. The authentication token payload 362 may include one or more claims for which authenticity may be verified via the authentication token signature 363. The claims may include data and/or information representative of the user being authenticated, the device with which the user is requesting authentication, the application and/or account being authenticated, and any other information being committed, bound or otherwise associated with the authentication, including the to-be-revealed data. Thus, upon authentication, the keyless account service 120 may also define, before, during or after the header, an authentication token payload 323. In some embodiments, the authentication token payload 362 may include data, e.g., in the form of a set of key-value pairs or other data structure. For example, each claim may include a key identifying a type according to one or more defined types associated with a particular claim, and a value representing the populated data for that claim according to the type (e.g., the user ID may have a key defining a type of ID (email, telephone, username, legal name, etc.) and a value populating the user's ID of that type (e.g., JohnDoe@gmail.com, (123)456-7890, johndoe1, John Doe, etc.).

In some embodiments, the keyless account service 120 may determine that authentication token claims, at 330, based on the authentication request 122, the user keyless account 310 among other configurations, policies, parameters, defaults, etc. For example, the authentication request 122 may specify the to-be-revealed data to cause the keyless account service 120 to determine the to-be-revealed data 305 as a claim. Alternatively, or in addition, the user keyless account 310 may be configured to cause the keyless account service 120 to include the to-be-revealed data as part of the authentication token claims.

In some embodiments, the authentication token claims may include, without limitation, claims as specified by the keyless account service 120, the authentication request 122 or both, e.g., as detailed above with reference to FIG. 3. For example, the claims may include a token expiration 331 (e.g., time, date, duration, etc.), a token issued-at time 332 (a date and/or time associated with issue the authentication token 123), an issuer ID 333 (e.g., an identifier associated with issuing the authentication token, such as an ID associated with the keyless account service 120 such as, for OIDC, the issuer ID 333 may be a unique ID of the OIDC provider), a client ID 301 (or client ID 311 since they are equivalent), a user ID 302 (or user ID 312 since they are equivalent), a nonce 304, among other data to be verified during validation 140.

In some embodiments, using the cryptographic protocol defined in the authentication token header 361, the keyless account service 120 may sign the authentication token payload 362, at 324, including the claims defined therein, to produce the authentication token signature 363. In some embodiments, the keyless account service 120 may sign the authentication token payload 362 and/or authentication token header 361 using keyless account service (KAS) keys 340 including a KAS secret key 341 and a KAS public key 342 paired with the KAS secret key 341. The KAS keys 340 may be associated with, derived based on, or otherwise related to the cryptographic protocol defined in the authentication token header 361.

In some embodiments, the keyless account service 120 may publish 350 the KAS public key 342 in order to allow external entities to use the KAS public key 342 to verify the authentication token signature 363. The keyless account service 120 may use the KAS secret key 341 to derive the KAS public key 342 and/or to sign the authentication token payload 362 and/or authentication token header 361 at 324.

In some embodiments, upon generating the authentication token signature 363, the keyless account service 120 may issue the authentication token 123, including the authentication token header 361, the authentication token payload 362 and the authentication token signature 363, and issue, at 325, the authentication token 123 to the cryptographic account 112 in response to the authentication request 122.

Figure 4:
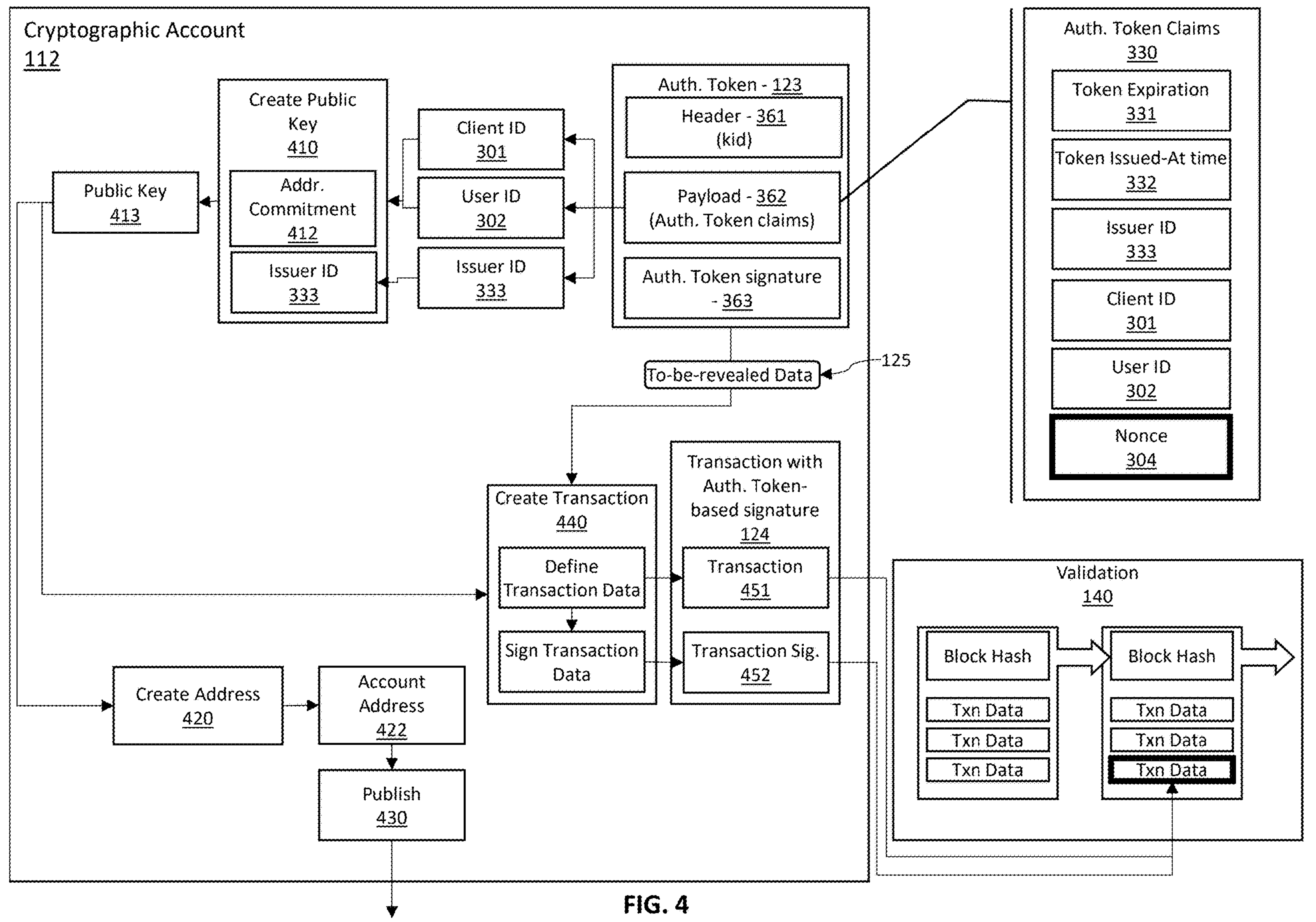
FIG. 4 depicts a cryptographic account creating and signing a transaction for submission to a blockchain ledger using the authentication token of the keyless account service in accordance with one or more embodiments of the present disclosure.

Referring now to FIG. 4, a cryptographic account is depicted creating and signing a transaction for submission to a blockchain ledger using the authentication token of the keyless account service in accordance with one or more embodiments of the present disclosure.

In some embodiments, the cryptographic account 112 may receive the authentication token 123 in response to the authentication request 122. In some embodiments, the authentication token 123 may include the authentication token header 361, authentication token payload 362, and the authentication token signature 363 as defined and produced by the keyless account service 120, including, e.g., any to-be-revealed data 305 of the authentication request 122. Thus, the cryptographic account 112 may employ the authentication token 123, including to-be-revealed data associated with one or more of the authentication token claim 330, to create and sign a transaction with authentication token-based signature 124 such that the to-be-revealed data may be verified during validation 140 as well as required to verify the transaction during validation 140.

In some embodiments, the authentication token payload 362 may include claims as specified by the keyless account service 120, the authentication request 122 or both, e.g., as detailed above with reference to FIG. 3. For example, the claims may include a token expiration 331 (e.g., time, date, duration, etc.), a token issued-at time 332 (a date and/or time associated with issue the authentication token 123), an issuer ID 333 (e.g., an identifier associated with issuing the authentication token, such as an ID associated with the keyless account service 120 such as, for OIDC, the issuer ID 333 may be a unique ID of the OIDC provider), a client ID 301 (or client ID 311 since they are equivalent), a user ID 302 (or user ID 312 since they are equivalent), a nonce 304, among other data to be verified during validation 140.

In some embodiments, using the authentication token payload 362, the cryptographic account 112 may create a public key 413 at 410 for a transaction. In some embodiments, creating the public key 413 may include accessing the issuer ID 333 of the authentication token payload 362 and an address commitment 412 based on the client ID 301 and the user ID 302 from the authentication token payload 362.

The address commitment 412 may include a hash, using one or more hash algorithms, of identifying information for use with the transaction. By hashing the identifying information, the identifying information can be hidden from discovery while using the hash to uniquely correspond to the user and/or the cryptographic account 112. Indeed, by creating the address commitment 412 from the client ID 301 and the user ID 302, the identifying information for the user and the identifying information for the cryptographic account 112 may be committed via the hash. Further, by using the client ID 301 and the user ID 302 provided via the authentication token 123, the address commitment 412 may hide a commitment to authenticated information, enabling the address commitment 412 to be verified in view of the authentication token payload 362. In some embodiments, to make the address commitment 412 less susceptible to replay attacks and/or to create single use address commitments 412, and thus single use public keys 413 (e.g., an "ephemeral public key"), the hash to create the address commitment 412 may include randomness, a nonce, or other variable or any combination thereof.

In some embodiments, the address commitment 412 and the issuer ID 333 may produce a public key 413 for use in verifying the transaction. Because the identifying information from the authentication token 123 is committed in the address commitment 412, the "secret key" associated with the public key 413 may be the user's ability to sign in to the keyless account service 120 via the managing application of the cryptographic account 112 committed in the client ID 301. Put differently, the "secret key" can be thought of as the user's credentials 313 for that account, which the user already knows, or a pre-installed HTTP cookie which precludes the need for the user to re-enter the password. Further, this password may not be sufficient. Rather, in some embodiments, the managing application must be available, must allow the user to sign in to the user keyless account 310 and receive the authentication token 123 including the authentication token signature 363.

In some embodiment, the cryptographic account 112 may use the public key 413 to create an address 422, at 420, for use with the transaction. To do so, the cryptographic account 112 may hash the public key 413 using one or more cryptographic hash functions. In some embodiments, the address 422 may also include, via the cryptographic hash function, the issuer ID 333 obtained form the authentication token payload 362. As a result, the address 422 may be a unique identifier for the cryptographic account 112 based on the client ID 301 and user ID 302 (via the address commitment 412) and the issuer ID 333, thus making the address dependent on the managing application of the cryptographic account 112, the user and the keyless account service 120 may be verifiable.

In some embodiments, the address 422 may be published 430, e.g., via storing the address 422 in associated with the cryptographic account 112 (e.g., under a cryptographic or blockchain address of the cryptographic account 112) so as to be accessible to the blockchain network 10.

In some embodiments, the create the transaction, at 440, for submission to the blockchain network 10, the cryptographic account 112 may define transaction data and sign the transaction data so as to produce a transaction 451 and a transaction signature 452.

In some embodiments, the defining the transaction data may include determining a transaction payload. As detailed above, in some embodiments, the transaction payload may include inputs, outputs, operations, and a digital signature. Inputs reference previous transaction outputs, and outputs specify the recipient's address and the amount. In some embodiments, transaction data may also include, e.g., public inputs for the transaction signature 452.

In some embodiments, the public inputs may include, e.g., a user ID key, the authentication token payload 362, the authentication token header 361, the public key (e.g., an ephemeral public key as detailed above), a signature under the public key over the transaction data (e.g., an "ephemeral signature"), the authentication token signature 363, the token expiration 331, a pepper, randomness, among other parameters or any combination thereof (see, e.g., FIG. 5 below).

In some embodiments, the public inputs may include, e.g., the authentication token header 361, the public key (e.g., an ephemeral public key as detailed above), a signature under the public key over the transaction data (e.g., an "ephemeral signature"), the to-be-revealed data 125, the token expiration 331, a zero-knowledge proof, among other parameters or any combination thereof (see, e.g., FIG. 6 below). For example, the zero-knowledge proof may be for verification of private information including, e.g., client ID 301, the user ID 302, randomness, the authentication token signature 363, the authentication token payload 362, a pepper, among other sensitive identifying information as described in greater detail below with reference to FIG. 6.

In some embodiments, the signature under the public key over the transaction data (e.g., an "ephemeral signature") may be the transactions signature 452. Thus, the transaction data may be verified based on the transaction signature 452 by fetching the public key 413 from the public inputs of the transaction 451, deriving an address from the fetched public key 413 and verifying the derived address against the published address 422, and verifying the signature under the fetched public key 413 over the transaction 451.

In some embodiments, the transaction with authentication token-based signature 124, including the transaction 451 and the transaction signature 452, may be submitted to the blockchain network 10 for validation 140 and insertion into a block of the ledger 130.

Figure 5:
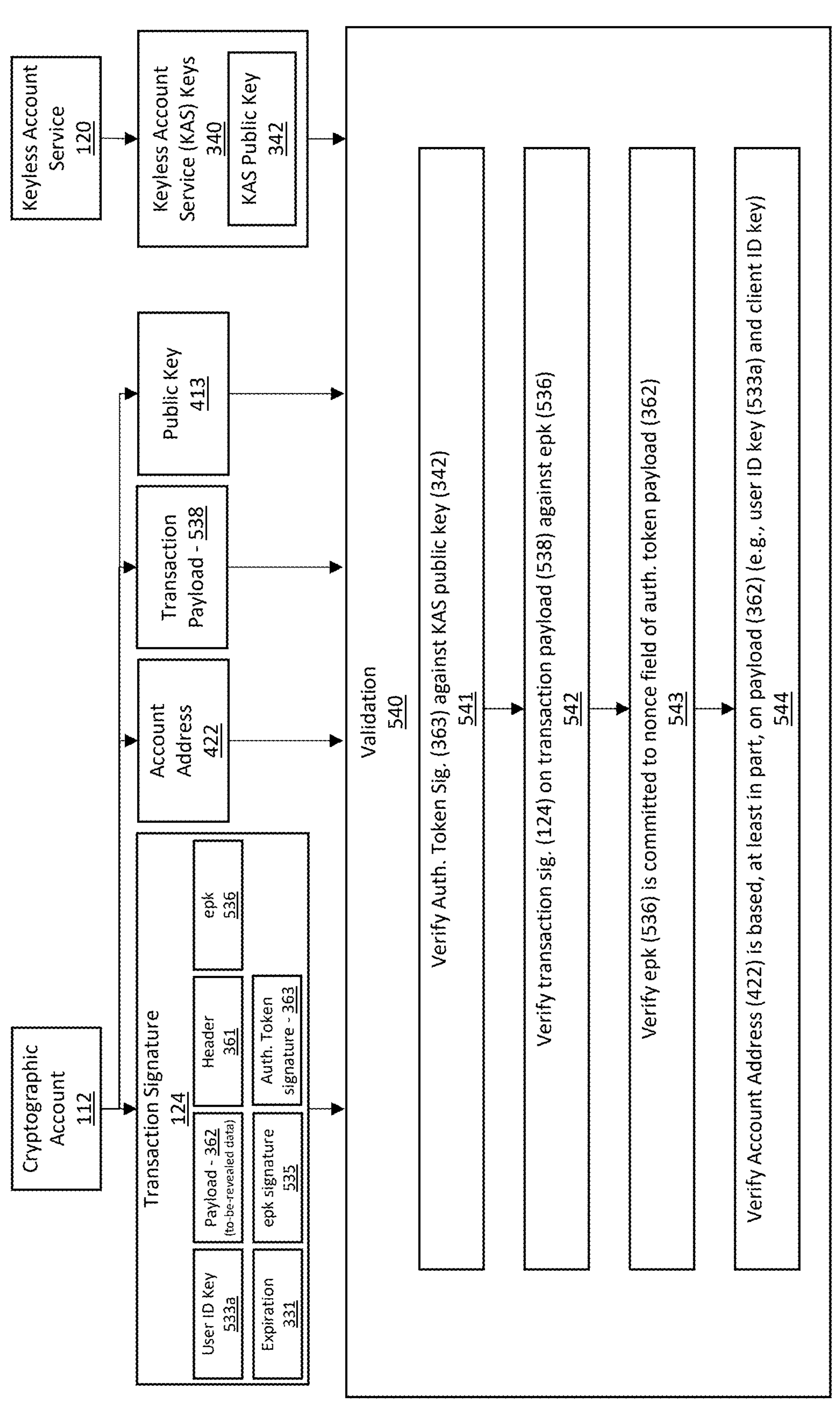
FIG. 5 depicts a validation mechanism for validating a transaction created and signed using the authentication token of the keyless account service in accordance with one or more embodiments of the present disclosure.

Referring now to FIG. 5, a validation mechanism is depicted for validating a transaction created and signed using the authentication token of the keyless account service in accordance with one or more embodiments of the present disclosure.

In some embodiments, validation 540 may use the transaction signature 124, the address 422 and the KAS public key 342 of the KAS keys 340 form the keyless account service 120. Based on this information, validation 540 may validate the transaction signature 124 and the data thereof. In some embodiments, the transaction data may include the authentication token payload 362 including the to-be-revealed data 125, a user ID key 533*a*, the authentication token header 361, an ephemeral public key (epk) 536, an epk signature 535, the authentication token expiration 331, the authentication token signature 363, and a transaction payload 538.

In some embodiments, the user ID key 533*a* may include the key of the key-value pair for the user ID claim of the authentication token. The epk 536 may include an epk populating the nonce field of the authentication token 123 and the authentication request 122. Thus, the epk 536 may be used as a limited time or limited use public key for signing the transaction payload 538. As such, the transaction signature 124 may include a signature over the transaction payload 538 under the epk 536. As a result, the epk 536 can be a public key for the transaction signature 124 associated with the authentication token 122 instead of a private key.

In some embodiments, at step 541, validation 540 may validate the authentication token signature 363. To do so, the user ID key 533*a*, the payload 362 (including the to-be-revealed data 125), the authentication token header 361, the expiration 331 and the epk 536, may be signed using the KAS public key 342 to create a derived keyless account service signature ($Sig_{kas}$). The $Sig_{kas}$ may be tested against the authentication token signature 363, and where there is a match, the authentication token signature 363 is verified. Because the authentication token signature 363 is embedded with the authentication token payload 362 and the authentication token header 361, including the claims and/or parameters thereof, and that the $Sig_{kas}$ is produced by signing over the authentication token payload 362 and the authentication token header 361, including the claims and/or parameters thereof, each using the KAS keys 340, the same inputs to the same signing algorithm produce the same signature, thus validating the inputs 564. In so doing, the claims of the authentication token 123 can be authenticated, which, as a result, authenticates to-be-revealed data 125 that is matched to one or more of the claims. Thus, validation 540 can validate the to-be-revealed data 125 in a way that protects confidentiality of the authentication token 123 while selectively revealing certain information associated with the user and/or user's identity. In some embodiments, this step verifies the authentication token signature by requiring that validators agree on the latest authentication tokens (e.g., public keys) of the keyless account service 120, which may publish them, e.g., at a particular URL.

In some embodiments, at step 542, validation 540 may verify the transaction signature 124 on the transaction payload 538 against the epk 536. To do so, the address 422 and the transaction payload 538, may be signed using the epk 536 to create a derived epk signature ($Sig_{epk}$). The $Sig_{epk}$ may be tested against the epk signature 535, and where there is a match, the epk signature 535 is verified. Because the epk signature 535 is embedded with the transaction payload 538 and the address 422, and that the $Sig_{epk}$ is produced by signing over the transaction payload 538 and address 422, each using the epk 536, the same inputs to the same signing algorithm produce the same signature, thus validating the inputs.

In some embodiments, the validation 540 may, at block 543, confirm the cpk 536 by checking the epk 536 is committed in the authentication token payload's 362 nonce field, e.g., including asserting authentication token payload ["nonce"] is to be shown as equal to a hash of the ephemeral public key and ephemeral public key expiration period (among other parameters such as a pepper, e.g., from the transaction signature where included). Moreover, the validation 540 may confirm that the expiration 331 associated with the epk 536 is within a predefined maximum horizon, e.g., by asserting ephemeral public key expiration period 331 is less than authentication token payload issued-at time plus a maximum expiration horizon, where maximum expiration horizon is an on-chain parameter so if an application mis-sets ephemeral public key expiration period as less than authentication token payload issued-at time, then the ephemeral public key will be expired from the perspective of the blockchain network 10. Additionally, the validation 540 may also or instead check that the epk 536 is not expired based on the expiration 331, e.g., including asserting that a current block time is less than the ephemeral public key expiration period.

In some embodiments, at step 544, the validation 540 may verify the account address 422 by verifying that the account address 422 is based, at least in part, on the payload 362, including the user ID key 533*a* and the client ID key, among other data. To do so, in some embodiments, the parameters of the payload 362 may be extracted and the account address may be reconstructed therefrom using the same technique as blocks 410 and 420 detailed above in reference to FIG. 4. By tested whether the reconstructed account address matches to the account address 422, validation 540 can verify that the transaction is attributable to the user's cryptographic account 112 and thus to the user.

In some embodiments, the user ID can be verified according to the user ID key 533*a*. For example, if using email-based IDs, validation 540 may ensure the email has been verified, e.g., if a user ID key 533*a* is to be shown as equal to "email", assert authentication token payload["email_verified"] is to be shown as equal to "true".

In some embodiments, the validation 540 may also set the user ID value to the value corresponding to the user ID key 533*a*. Thus, the validation may let user ID value (in the payload 362) be set from the user ID key 533*a* in the authentication token payload 362.

In some embodiments, validation 540 may derive the public key of the cryptographic account 112 based on the user ID key 533*a*, the user ID value and the client ID in the authentication token payload 362. The validation 540 may then verify that the derived public key matches the keyless account-based address 422 on-chain by asserting that the keyless account-based address 422 is to be shown as equal to a hash of keyless account service identifier and identity commitment.

In some embodiments, the example of the keyless account service 120 being an OAuth/OpenID authentication mechanism such as an OIDC provider and the authentication token being a JWT, the transaction signature may be over a transaction txn for an address with keyless account-based address auth_key is defined as:

σtxn=(uid_key,jwt,header,epk,ceph,coidc,exp_date,ρ,r, idc_aud_val)

where:

a. uid_key is the JWT field's name that stores the user's identity, whose value is committed in the address IDC, b. jwt is the JWT payload, c. header is the JWT header; indicates the OIDC signature scheme and the JWK's key ID, which may be used to verify the OIDC signature under the correct PK, d. epk, is an ephemeral public key (EPK) generated by the managing application (its associated esk is kept secret on the application managing the cryptographic account 112), e. σeph is an ephemeral signature over the transaction txn, f. σoidc is the OIDC signature over the full JWT (e.g., over the header and jwt payload), g. exp_date is a timestamp past which epk is considered expired and cannot be used to sign TXN, h. ρ is a high-entropy EPK blinder used to create an EPK commitment to epk and exp_date that is stored in the jwt["nonce"] field, i. r is a pepper for the address IDC, In such an example, to verify the σtxn signature, validators may check, at validation 140, that the OIDC provider (1) signed the user identifier and application identifier that are committed in the address IDC (or, the recovery service's ID) and (2) signed the EPK which, in turn, signed the transaction, while enforcing some expiration date on the EPK.

In this example, validation 540 may include signature verification against the PK (iss_val,addr_idc), which may involve the following:

a. If using email-based IDs, ensure the email has been verified, e.g., if uid_key is to be shown to be equal to "email", assert jwt["email_verified"] is to be shown to be equal to "true", b. Assert addr_idc is to be shown to be equal to H'(uid_key,uid_val,aud_val;r), using the pepper r from the signature, c. Verify that the PK matches the keyless account-based address on-chain, including asserting auth_key is to be shown to be equal to H(iss_val,addr_idc), d. Check the EPK is committed in the JWT's nonce field including asserting jwt["nonce"] is to be shown to be equal to H'(epk, exp_date;ρ), e. Check the EPK expiration date is not too far off into the future including asserting exp_date is less than jwt["iat"]+max_exp_horizon, where max_exp_horizon is an on-chain parameter, f. Check the EPK is not expired, including asserting current_block_time( ) is less than exp_date, g. Verify the ephemeral signature seph under epk over the transaction txn, h. Fetch the correct PK of the OIDC provider, denoted by jwk, which is identified via the kid field in the JWT header and i. Verify the OIDC signature σoidc under jwk over the JWT header and payload jwt. In some embodiments, this step that verifies the OIDC signature requires that validators agree on the latest JWKs (i.e., public keys) of the OIDC provider, who publishes them at a provider-specific OpenID configuration URL.

In some embodiments, as detailed above, the user may desire or be required to reveal additional information, for example to enable further operations on the blockchain network based on the additional information. Thus, the public information, provided in the transaction data, may include the additional information. Indeed, the to-be-revealed data 305 may be included in an "extra field" associated with providing additional information in the authentication request 122 and the authentication token 123, as well as in the transaction data of the transaction payload 538.

In some embodiments, the extra field may be assigned a certain type of data, such as a user identifier, user contact information, name, location, address, terms of the transaction (e.g., for a contract or agreement), among other data types or any combination thereof. Alternatively, or in additional, the extra field may be assigned no type of data such that the user may populate the extra field with any information.

In some embodiments, in order for the additional information to be verified, the additional information may be included within the authentication token payload. For example, the additional field may be populated with user data that would ordinarily be private or otherwise omitted from the transaction data. But in some scenarios, the user may wish to reveal such information. Thus, the user may include the user data in the extra field of the transaction data as well as a custom check name of the authentication request and/or authentication token. Thus, because the user data is included as a parameter of the authentication token payload, the extra field may be proven via the authentication token signature and the contents of the authentication token payload.

In some embodiments, the extra field may be matched to a standard check name in the authentication token payload (e.g., including those detailed above), or may be in a custom check name field of the authentication token payload. To match the extra field to such check name in the authentication token payload, the extra field may include a key and value, where the key may be set to be the key of the associated check name in the authentication token payload, and the value is set to be the associated additional information. Accordingly, validation 140 may, via the authentication token signature, include verifying that the extra field value is to be shown to be the authentication token payload value associated with the extra field key. For example, in the OAuth/OpenID authentication mechanism, the additional information may be a mailing address, thus the extra field key may be set to be a custom mailing address key with the custom mailing address value such that on validation 140 it is asserted that extra_field_val is to be shown to be jwt[extra_field_key].

Figure 6:
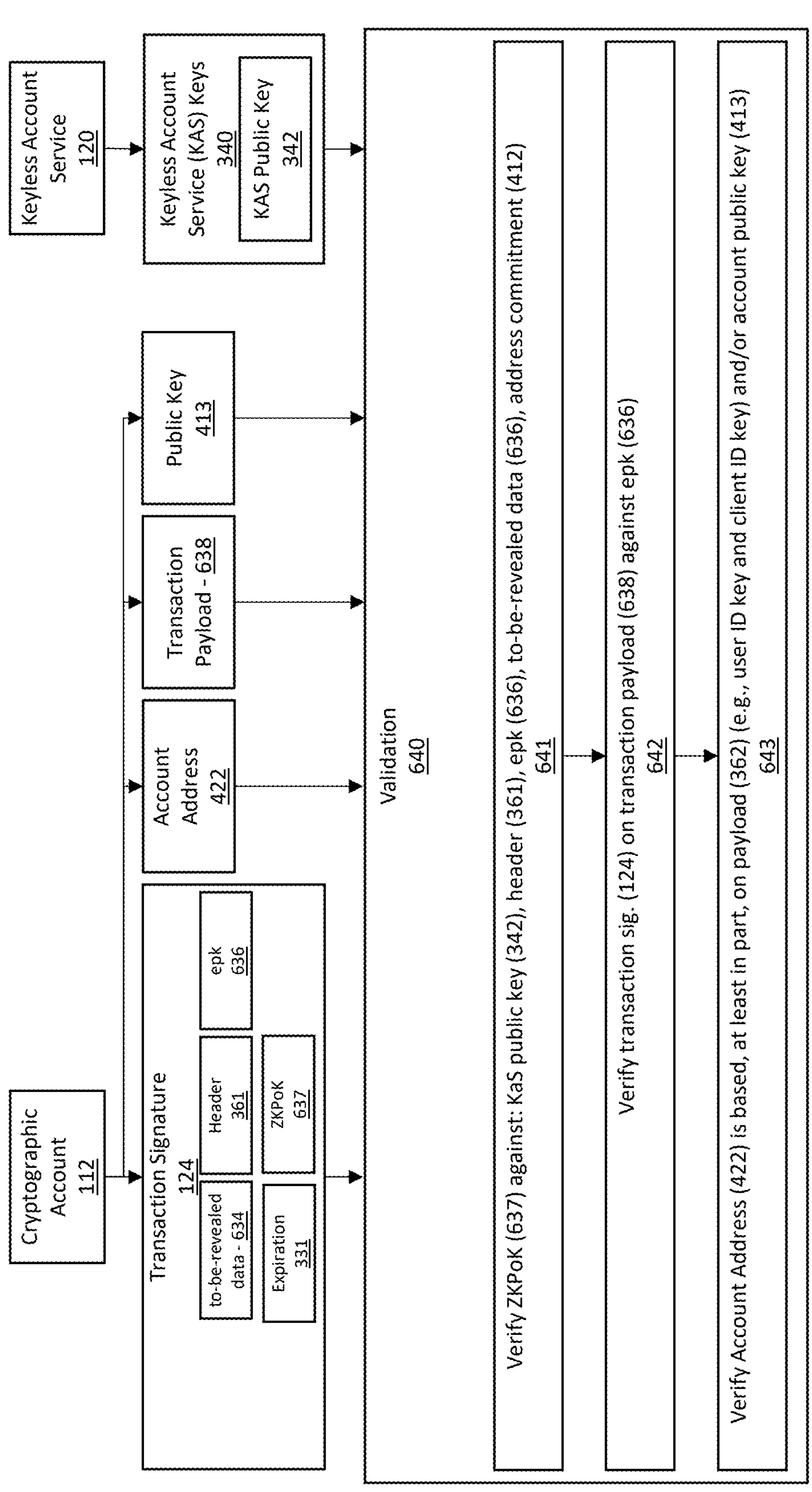
FIG. 6 depicts another validation mechanism for validating a transaction created and signed using the authentication token of the keyless account service in accordance with one or more embodiments of the present disclosure.

Referring now to FIG. 6, another validation mechanism is depicted for validating a transaction created and signed using the authentication token of the keyless account service in accordance with one or more embodiments of the present disclosure.

In some embodiments, the above transactions include the user identifier and authentication token payload, which reveals user information to the blockchain network. Accordingly, to further improve security and confidentiality, the transaction may be based on zero-knowledge signatures. Thus, instead of the user identifier, authentication token payload and authentication token signature, the transaction may include the authentication token header, the ephemeral public key, the ephemeral public key signature, the expiration period, the expiration maximum, and a zero-knowledge proof, where the zero-knowledge proof proves private information including the application identifier, user identifier, authentication token signature, and authentication token payload.

In some embodiments, a zero-knowledge proof (ZKP) includes a cryptographic protocol that enables one party (the prover) to demonstrate to another party (the verifier) that a specific statement is true, without revealing any information beyond the validity of the statement itself. In other words, the prover can convince the verifier that they possess certain knowledge or that a computation was performed correctly, without disclosing the underlying data or the secret itself.

In the context of blockchain and authentication systems, a zero-knowledge proof allows a user to prove, for example, that they have been authenticated by the keyless account service 120 or that they possess a valid credential, without revealing their identity or any sensitive information. The ZKP achieves this by constructing a mathematical relation (often called a zero-knowledge relation) between public inputs (which may include to-be-revealed fields) and secret inputs (such as authentication tokens or private keys). The proof is then verified by checking that the public inputs satisfy the relation, as asserted by the ZKP, without exposing the secret inputs.

A common type of ZKP used in practice is the non-interactive zero-knowledge proof (NIZK), such as a zk-SNARK (Zero-Knowledge Succinct Non-Interactive Argument of Knowledge), which allows the proof to be generated and verified efficiently, often with a single message from the prover to the verifier.

Therefore, in some embodiments, validation 640 may use the transaction signature 124, including the authentication token-based transaction signature, the account address 422, the transaction payload 638, the public key 413 and the KAS public key 342 of the KAS keys 340 from the keyless account service 120. Based on this information, validation 640 may validate the transaction signature 124 and the data thereof with zero-knowledge proving. In some embodiments, the transaction data may include the to-be-revealed data 634, the authentication token header 361, an ephemeral public key (epk) 636, an epk signature 635, the authentication token expiration 331, and a zero-knowledge proof of knowledge (ZKPoK) 637 to validate the transaction signature 124 against the transaction payload 638.

In some embodiments, the epk 636 may include an epk populating the nonce field of the authentication token 123 and the authentication request 122. Thus, the epk 636 may be used as a limited time or limited use public key for signing the transaction. As such, the transaction signature 124 may include an epk signature that is a signature over the transaction payload 638 under the epk 636. As a result, the epk 636 can be a public key for the transaction signature 124 associated with the authentication token 122 instead of a private key.

In some embodiments, at step 641, validation 540 may validate the ZKPoK 660 by deriving a public inputs hash that hashes the derived public inputs 666 of a zero-knowledge algorithm, e.g., utilizing one or more of Succinct Non-Interactive ARguments of Knowledge (SNARK), Scalable Transparent ARgument of Knowledge (STARK), Verifiable Polynomial Delegation (VPD), Succinct Non-interactive ARGuments (SNARG), bulletproofs, among others or any combination thereof. Validating ZKPoK 660 may include deriving the public input by accessing data in the transaction payload 638 and/or deriving items based on the data in the transaction payload 638. In some embodiments, a validator may fetch the epk 636, expiration 331, keyless account service identifier, authentication token header 361, and KAS public key 342 of the keyless account service 120, as well as the address 422 and/or public key 413 associated with the cryptographic account 112.

In some embodiments, the zero-knowledge proof may argue the existence of a secret input that satisfies a keyless zero-knowledge relation. In some embodiments, the secret input, $w_{priv}$, may include, e.g., the client ID value 601*b*, user ID key 633*a* and/or user ID value 633*b*, authentication token signature 363, and authentication token payload 362. Thus, the zero-knowledge proof may prove the relation R 668 according to equation 1 below:

$$R\left(\begin{array}{c} pih; \\ w = [w_{pub} = (epk, addr_{idc}, \exp_{date}, \exp_{maximum}, iss, \text{header}, pk), \\ w_{priv} = (aud, uid, \sigma_{AT}, \text{payload}_{AT})] \end{array}\right) \quad \text{Eq. 1}$$

where $w_{pub}$ are the public inputs, $w_{priv}$ are the private inputs, epk is the ephemeral public key, $addr_{idc}$ is the identity commitment, $\exp_{date}$ is an expiration period of the epk 636, $\exp_{maximum}$ is the expiration period maximum of the epk 636, iss is the keyless account service identifier, header is the authentication token header 361, pk is the KAS public key 342, aud is the client ID value 601*b* for the application managing the cryptographic account 112, uid is the user ID value 633*b*, $\sigma_{AT}$ is the authentication token signature 363, and $\text{payload}_{AT}$ is the authentication token payload 362.

In some embodiments, as detailed above, the user may desire or be required to reveal additional information, for example to enable further operations on the blockchain network based on the additional information. Thus, the public information, provided in the transaction data and derived as public inputs to the zero-knowledge proof, may include the additional information. Indeed, the transaction data may include the to-be-revealed data 634, e.g, in an "extra field" associated with providing additional information.

In some embodiments, the extra field may be assigned a certain type of data, such as a user identifier, user contact information, name, location, address, terms of the transaction (e.g., for a contract or agreement), among other data types or any combination thereof. Alternatively, or in additional, the extra field may be assigned no type of data such that the user may populate the extra field with any information.

In some embodiments, in order for the additional information to be verified, the additional information may be included within the authentication token payload. For example, the additional field may be populated with a user identifier. As detailed above, such information would ordinarily be in the private inputs, but in some scenarios, the user may wish to reveal such information. Thus, the user may include the user identifier in the extra field of the transaction data. Because the user identifier is a parameter of the authentication token payload, the extra field may be proven via the zero-knowledge proof and the contents of the authentication token payload of the secret inputs.

In some embodiments, the extra field may be matched to a standard check name in the authentication token payload (e.g., including those detailed above), or may be in a custom check name field of the authentication token payload. To match the extra field to such check name in the authentication token payload, the extra field may include a key and value, where the key may be set to be the key of the associated check name in the authentication token payload, and the value is set to be the associated additional information. Accordingly, validation 140 may, via the zero-knowledge proof, include verifying that the extra field value is to be shown to be the authentication token payload value associated with the extra field key. For example, in the OAuth/OpenID authentication mechanism, the additional information may be an email address, thus the extra field key may be set to be the uid key with the uid value such that on validation 140 it is asserted that extra_field_val is to be shown to be jwt[extra_field_key].

In some embodiments, at step 642, validation 640 may validate the transaction signature 124 against the epk 636. To do so, the address 422, the transaction payload 638 and the ZKPoK 637, may be signed using the epk 636 to create a derived epk signature ($Sig_{epk}$). The $Sig_{epk}$ may be tested against the transaction signature 124, and where there is a match, the transaction signature 124 is verified.

In some embodiments, at step 643, the validation 640 may verify the account address 422 by verifying that the account address 422 is based, at least in part, on the payload 362, including the user ID key and the client ID key, among other data. To do so, in some embodiments, the parameters of the payload 362 may be extracted and the account address may be reconstructed therefrom using the same technique as blocks 410 and 420 detailed above in reference to FIG. 4. By tested whether the reconstructed account address matches to the account address 422, validation 640 can verify that the transaction is attributable to the user's cryptographic account 112 and thus to the user.

In some embodiments, the user ID can be verified according to the user ID key. For example, if using email-based IDs, validation 640 may ensure the email has been verified, e.g., if a user ID key is to be shown as equal to "email", assert authentication token payload["email_verified"] is to be shown as equal to "true".

In some embodiments, the validation 640 may also set the user ID value to the value corresponding to the user ID key. Thus, the validation may let user ID value (in the payload 362) be set from the user ID key in the authentication token payload 362.

In some embodiments, validation 640 may derive the public key of the cryptographic account 112 based on the user ID key, the user ID value and the client ID in the authentication token payload 362. The validation 640 may then verify that the derived public key matches the keyless account-based address 422 on-chain by asserting that the keyless account-based address 422 is to be shown as equal to a hash of keyless account service identifier and identity commitment.

Figure 7:
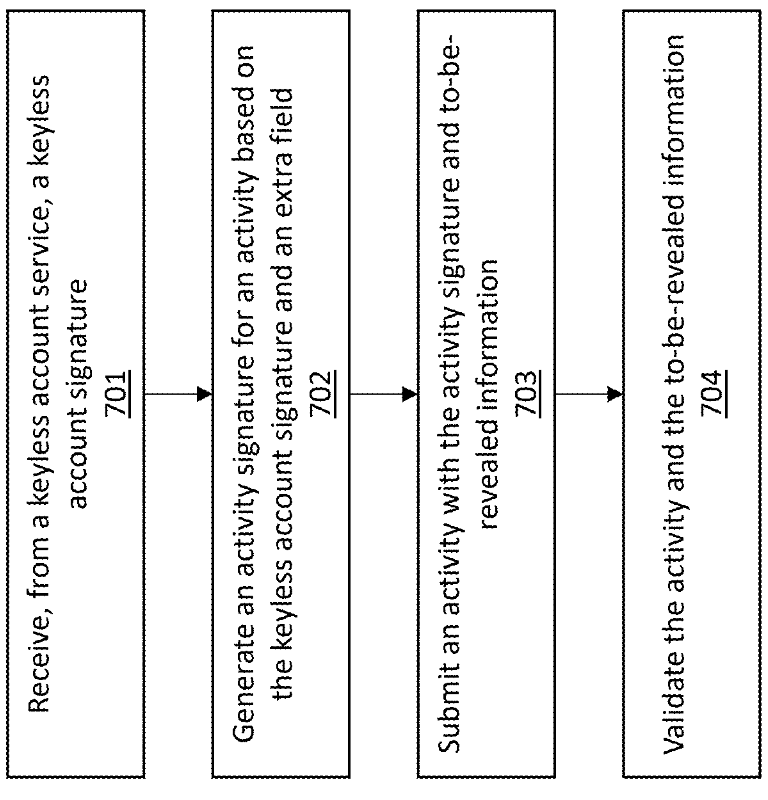
FIG. 7 is a flowchart for an exemplary method of selectively revealing verifiable private information on a blockchain in accordance with one or more embodiments of the present disclosure.

Referring now to FIG. 7, a flowchart is depicted for an exemplary method of selectively revealing verifiable private information on a blockchain in accordance with one or more embodiments of the present disclosure.

In some embodiments, keyless account services may be leveraged to enable selectively revealing otherwise private information on the blockchain. Accordingly, in some embodiments, at step 701, a keyless account service signature may be received from a keyless account service. The keyless account service signature may include a cryptographic signature over private authentication information such as a user identifier, application identifier, client device identifier, among other information or any combination thereof. Such information may instead be used to authenticate with the keyless account service to have such information signed to prove authenticity.

In some embodiments, the keyless account service signature may additionally or alternatively sign over additional information specified by user. Thus, the user may have the additional information authenticated such that proof of authentication may be obtained when revealing on the blockchain.

In some embodiments, at step 702, an activity signature may be produced that signs an activity being submitted to the blockchain. The activity may include public data fields populated with public data, an extra field populated with the additional information and a zero-knowledge proof configured for using the public data and the additional information to prove a relation with secret inputs.

In some embodiments, at step 703, the activity and the activity signature may be submitted to the blockchain for validation and execution. In some embodiments, at step 704, the blockchain network, including one or more nodes on the blockchain, may validate the activity signature based on the activity. To do so, the validation may perform the zero-knowledge proof to provide the relation between the secret inputs and the public data and the additional information.

Figure 8:
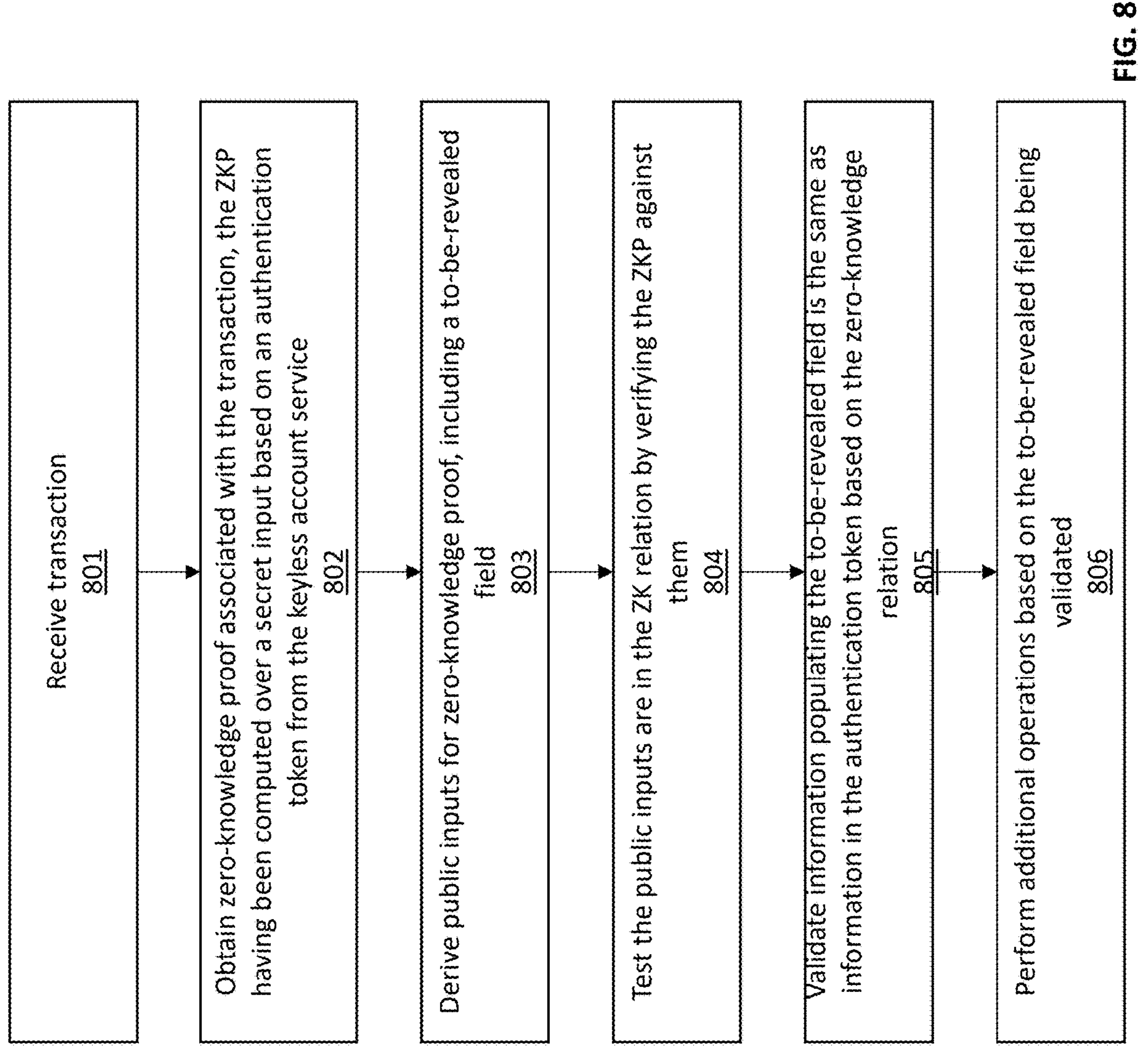
FIG. 8 is flowchart for an exemplary method of verifying selectively revealed verifiable private information on a blockchain in accordance with one or more embodiments of the present disclosure.

Referring now to FIG. 8, a flowchart is depicted for an exemplary method of verifying selectively revealed verifiable private information on a blockchain in accordance with one or more embodiments of the present disclosure.

In some embodiments, validation of a transaction submitted to the blockchain may include verifying additional information provided via an extra field of the transaction. As a result, additional downstream operations and/or tasks on the blockchain network are enabled with the additional information.

In some embodiments, at step 801, the blockchain network may receive a transaction. The transaction may include data such as public information regarding details of the transaction, an extra field populated with additional information, and an authentication token issued by a keyless account service. The keyless account service may authenticate a user associated with eh transaction based on authentication information and provide an authentication token to the user. The transaction may be signed using the authentication token to derive a public key and/or authentication key, and the extra field may be populated with data in a payload of the authentication token.

In some embodiments, at step 802, a zero-knowledge proof may be identified and fetched from the transaction. The zero-knowledge proof may include secret inputs associated with the authentication token, such as a user identifier, application identifier, client identifier, among other private information or any combination thereof. In some embodiments, the authentication token may also include additional data, such as custom check names related to the additional information populating the extra field.

In some embodiments, at step 803, public hash inputs for the zero-knowledge proof are derived. For example, the public information and/or the extra field of the transaction data may be extracted to define the public inputs for a relation of the zero-knowledge proof. Thus, the additional information is present, directly or indirectly (e.g., via a commitment or as a component of other data), in both the public and secret inputs, enabling the relation to hold.

In some embodiments, at step 804, the zero-knowledge proof may be performed by testing the relation given the secret input and the obtained public hash inputs. Because the additional information in the extra field is present in the public hash inputs and in the secret inputs via the authentication token data, the relation may be proven such that the additional information is proven authentic.

Accordingly, in some embodiments, in step 805, the information populating the extra field is validated as the same information in the authentication token.

As a result of the validation, in some embodiments, in step 806, one or more additional operations may be performed on the blockchain network based on the extra field, and the additional information therein, being validated. In some embodiments, the additional operations may include know-your-customer analysis based on additional information include the user's name, age, address, social security number, among other data that may be populated into the extra field and the authentication token payload. Similarly, such information may be used for fraud risk analysis and/or assessment, among other analyses. In some embodiments, the additional operations may include automated communication with the user based on contact information in the extra field and authentication token payload.

Accordingly, by providing fields for additional information in the transaction data and the authentication token of a keyless access service, the additional information that would ordinarily not be revealed on the blockchain may be revealed when desired. When not desired, such fields may be left blank, set to null, populated with a numerical such as 1, or other placeholding technique or any combination thereof. Accordingly, users may reveal, on demand, any information needed for performing downstream operations.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) Open VMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24).NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data.

The aforementioned examples are, of course, illustrative and not restrictive.

At least some aspects of the present disclosure will now be described with reference to the following numbered clauses.

Clause 1. A method including: receiving, by at least one processor, from a keyless account service in response to an authentication request, a keyless account service signature including a cryptographic signature, the cryptographic signature being configured to sign over a user identifier, a managing application identifier of a managing application, a nonce and to-be-revealed data; where the managing application is configured for managing activities by the user on a blockchain; where the nonce is populated with at least one public key associated with the authentication request; where the to-be-revealed data is associated with the authentication request; generating, by the at least one processor, for a particular activity, an activity signature including a second cryptographic signature based at least in part on the keyless account service signature and at least one to-be-revealed data field associated with the to-be-revealed data; where the at least one to-be-revealed data field is configured to be populated with the to-be-revealed data representative of to-be-revealed information associated with the authentication request; and submitting, by the at least one processor to the blockchain, the particular activity with the activity signature and the to-be-revealed information; where the blockchain is configured to validate the particular activity based at least in part on validating the activity signature using: the at least one public key to verify the activity signature based at least in part on: the keyless account service signature and the at least one to-be-revealed data field; and where the validating of the activity signature causes at least one operation on the blockchain to be performed based at least in part on the to-be-revealed information having been validated.

Clause 2. The method of clause 1, further including: where the activity signature includes a zero-knowledge proof of knowledge (ZKPoK) including a zero-knowledge relation applied to at least one secret input including the keyless account service signature; where the at least one to-be-revealed data field includes a public input to the zero-knowledge relation of the ZKPoK; and where, for the particular activity, the blockchain is configured to validate the ZKPoK of the keyless account service signature and the at least one to-be-revealed data field based at least in part on the at least one secret input and the zero-knowledge relation.

Clause 3. The method of clause 2, further including obtaining, by the at least one processor, the ZKPoK of the keyless account service signature using at least one zero-knowledge proving service.

Clause 4. The method of clause 1, where the activity signature is based at least in part on an ephemeral to-be-revealed key.

Clause 5. The method of clause 4, where the activity signature is based at least in part on an expiration date defining a time at which the ephemeral to-be-revealed key is configured to expire.

Clause 6. The method of clause 1, where the at least one to-be-revealed data is omitted from the at least one to-be-revealed data field.

Clause 7. The method of clause 1, where the blockchain is configured to provide the to-be-revealed information to at least one entity to perform at least one fraud risk assessment.

Clause 8. A non-transitory computer-readable medium having software instructions stored thereon, where the software instructions, upon execution, are configured to cause at least one processor to perform a method including: receiving, from a keyless account service in response to an authentication request, a keyless account service signature including a cryptographic signature, the cryptographic signature being configured to sign over a user identifier, a managing application identifier of a managing application, a nonce and to-be-revealed data; where the managing application is configured for managing activities by the user on a blockchain; where the nonce is populated with at least one public key associated with the authentication request; where the to-be-revealed data is associated with the authentication request; generating for a particular activity, an activity signature including a second cryptographic signature based at least in part on the keyless account service signature and at least one to-be-revealed data field associated with the to-be-revealed data; where the at least one to-be-revealed data field is configured to be populated with the to-be-revealed data representative of to-be-revealed information associated with the authentication request; and submitting, to the blockchain, the particular activity with the activity signature and the to-be-revealed information; where the blockchain is configured to validate the particular activity based at least in part on validating the activity signature using at least one to-be-revealed key to generate a validating activity signature based at least in part on the keyless account service signature and the at least one to-be-revealed data field; and where the validating the activity signature causes at least one operation on the blockchain to be performed based at least in part on the to-be-revealed information having been validated.

Clause 9. The non-transitory computer-readable medium of clause 8, where the activity signature includes a zero-knowledge proof of knowledge (ZKPoK) including a zero-knowledge relation applied to at least one secret input including the keyless account service signature; where, for the particular activity, the blockchain is configured to validate the ZKPoK of the keyless account service signature and the at least one to-be-revealed data field based at least in part on the at least one secret input and the zero-knowledge relation; and where the at least one to-be-revealed data field includes a public input to the zero-knowledge relation of the ZKPoK.

Clause 10. The non-transitory computer-readable medium of clause 9, where the method further includes obtaining the ZKPoK of the keyless account service signature using at least one zero-knowledge proving service.

Clause 11. The non-transitory computer-readable medium of clause 8, where the activity signature is based at least in part on an ephemeral to-be-revealed key.

Clause 12. The non-transitory computer-readable medium of clause 11, where the activity signature is based at least in part on an expiration date defining a time at which the ephemeral to-be-revealed key is configured to expire.

Clause 13. The non-transitory computer-readable medium of clause 8, where the to-be-revealed data is omitted from the at least one to-be-revealed data field.

Clause 14. The non-transitory computer-readable medium of clause 8, where the blockchain is configured to provide the to-be-revealed information to at least one entity to perform at least one fraud risk assessment.

Clause 15. A system including: at least one processor in communication with at least one non-transitory computer readable medium having software instructions stored thereon, where the at least one processor, upon execution of the software instructions, is configured to perform a method including: receiving, from a keyless account service in response to an authentication request, a keyless account service signature including a cryptographic signature, the cryptographic signature being configured to sign over a user identifier, a managing application identifier of a managing application, a nonce and to-be-revealed data; where the managing application is configured for managing activities by the user on a blockchain; where the nonce is populated with at least one public key associated with the authentication request; where the to-be-revealed data is associated with the authentication request; generating, for a particular activity, an activity signature including a second cryptographic signature based at least in part on the keyless account service signature and at least one to-be-revealed data field associated with the to-be-revealed data; where the at least one to-be-revealed data field is configured to be populated with the to-be-revealed data representative of to-be-revealed information associated with the authentication request; and submitting, to the blockchain, the particular activity with the activity signature and the to-be-revealed information; where the blockchain is configured to validate the particular activity based at least in part on validating the activity signature using at least one to-be-revealed key to generate a validating activity signature based at least in part on the keyless account service signature and the at least one to-be-revealed data field; and where the validating go the activity signature causes at least one operation on the blockchain to be performed based at least in part on the to-be-revealed information having been validated.

Clause 16. The system of clause 15, where the activity signature includes a zero-knowledge proof of knowledge (ZKPoK) including a zero-knowledge relation applied to at least one secret input including the keyless account service signature; where, for the particular activity, the blockchain is configured to validate the ZKPoK of the keyless account service signature and the at least one to-be-revealed data field based at least in part on the at least one secret input and the zero-knowledge relation; and where the at least one to-be-revealed data field includes a public input to the zero-knowledge relation of the ZKPoK.

Clause 17. The system of clause 16, where the method further includes obtaining the ZKPoK of the keyless account service signature using at least one zero-knowledge proving service.

Clause 18. The system of clause 15, where the activity signature is based at least in part on an ephemeral to-be-revealed key; and where the activity signature is based at least in part on an expiration date defining a time at which the ephemeral to-be-revealed key is configured to expire.

Clause 19. The system of clause 15, where the at least one to-be-revealed data is omitted from the at least one to-be-revealed data field.

Clause 20. The system of clause 15, wherein the blockchain is configured to provide the to-be-revealed information to at least one entity to perform at least one fraud risk assessment.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiment of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method comprising:

transmitting, by at least one processor of a computing device to a keyless account service comprising a third-party authentication server, an authentication request, the authentication request comprises at least one of a name, an email address, a phone number, an application identifier, a device identifier associated with the computing device, a user identifier, a social media profile, or any combination thereof;

receiving, by the at least one processor of the computing device, from the keyless account service, in response to a positive authentication of the authentication request, an authentication token comprising a keyless account service signature and to-be-revealed information attested to by the keyless account service;

wherein the keyless account service signature is associated with a keyless account service public key of the keyless account service and is computed over at least the following:

a first public key associated with a managing application of a user, and the to-be-revealed information attested to by the keyless account service:

generating, by the at least one processor, a request to perform a particular activity and an activity signature, wherein the activity signature is associated with the first public key and is computed over at least the request to perform the particular activity;

submitting, by the at least one processor to a blockchain network, via the managing application, the request to perform the particular activity, the activity signature, and at least one proof of knowledge of the keyless account service signature being a valid keyless account service signature computed over at least the to-be-revealed information;

wherein the blockchain network is configured to:

validate the request to perform the particular activity, based at least in part on a verification, using the first public key, of the activity signature;

obtain and reveal the to-be-revealed information based at least in part on a verification, using the keyless account service public key, of the keyless account service signature to generate a revealed information;

validate the keyless account service signature by verifying the at least one proof of knowledge of the valid keyless account service signature, wherein the valid keyless account service signature validates the revealed information as attested to by the keyless account service; and wherein, upon successful validation of the activity signature, and the keyless account service signature, the blockchain network is further configured to:

permit at least one operation based at least in part on the request to perform the particular activity.

2. The method of claim 1, wherein the at least one proof of knowledge comprises a zero-knowledge proof of knowledge (ZKPoK) comprising a zero-knowledge relation applied to at least one secret input comprising the keyless account service signature;

wherein the to-be-revealed information comprises a public input to the zero-knowledge relation of the ZKPoK; and wherein, for the particular activity, the blockchain is configured to validate the ZKPoK of the keyless account service signature and the to-be-revealed information based at least in part on the at least one secret input and the zero-knowledge relation.

3. The method of claim 2, further comprising obtaining, by the at least one processor, the ZKPoK of the keyless account service signature using at least one zero-knowledge proving service.

4. The method of claim 1, wherein the activity signature is based at least in part on an ephemeral to-be-revealed key.

5. The method of claim 4, wherein the activity signature is based at least in part on an expiration date defining a time at which the ephemeral to-be-revealed key is configured to expire.

6. The method of claim 1, wherein the blockchain is configured to provide the to-be-revealed information to at least one entity to perform at least one fraud risk assessment.

7. The method of claim 1, wherein the managing application is configured for managing activities by the user on a blockchain.

8. The method of claim 1, wherein a nonce field of the authentication token is populated with at least the first public key associated with the authentication request.

9. The method of claim 1, wherein the to-be-revealed information is associated with the authentication request.

10. The method of claim 9, wherein the to-be-revealed information is configured to be populated with to-be-revealed data representative of the to-be-revealed information associated with the authentication request.

11. The method of claim 1, wherein the activity signature is computed over the particular activity, the keyless account service signature and the to-be-revealed information.

12. The method of claim 1, wherein the keyless account service signature is over:

the first public key associated with the user identifier, a managing application identifier of the managing application of the user, a nonce field, and at least one data item representing the to-be-revealed information.

13. The method of claim 12, wherein the nonce field is populated with the first public key.

14. A non-transitory computer-readable medium having software instructions stored thereon, wherein the software instructions, upon execution, are configured to cause at least one processor to perform a method comprising:

transmitting, by a computing device to a keyless account service comprising a third-party authentication server, an authentication request, the authentication request comprises at least one of a name, an email address, a phone number, an application identifier, a device identifier associated with the computing device, a user identifier, a social media profile, or any combination thereof;

receiving, from the keyless account service, in response to a positive authentication of the authentication request, an authentication token comprising a keyless account service signature and to-be-revealed information attested to by the keyless account service;

wherein the keyless account service signature is associated with a keyless account service public key of the keyless account service and is computed over at least the following:

a first public key associated with a managing application of a user, and the to-be-revealed information attested to by the keyless account service;

generating a request to perform a particular activity and an activity signature, wherein the activity signature is associated with the first public key and is computed over at least the request to perform the particular activity;

submitting, to a blockchain network, via the managing application, the request to perform the particular activity, the activity signature, and at least one proof of knowledge of the keyless account service signature being a valid keyless account service signature computed over at least the to-be-revealed information:

wherein the blockchain network is configured to:

validate the request to perform the particular activity, based at least in part on a verification, using the first public key, of the activity signature;

obtain and reveal the to-be-revealed information based at least in part on a verification, using the keyless account service public key, of the keyless account service signature to generate a revealed information;

validate the keyless account service signature by verifying the at least one proof of knowledge of the valid keyless account service signature, wherein the valid keyless account service signature validates the revealed information as attested to by the keyless account service; and wherein, upon successful validation of the activity signature, and the keyless account service signature, the blockchain network is further configured to:

permit at least one operation based at least in part on the request to perform the particular activity.

15. The non-transitory computer-readable medium of claim 14:

wherein the at least one proof of knowledge comprises a zero-knowledge proof of knowledge (ZKPoK) comprising a zero-knowledge relation applied to at least one secret input comprising the keyless account service signature;

wherein, for the particular activity, the blockchain is configured to validate the ZKPoK of the keyless account service signature and the to-be-revealed information based at least in part on the at least one secret input and the zero-knowledge relation; and wherein the to-be-revealed information comprises a public input to the zero-knowledge relation of the ZKPoK.

16. The non-transitory computer-readable medium of claim 15, wherein the method further comprises obtaining the ZKPoK of the keyless account service signature using at least one zero-knowledge proving service.

17. The non-transitory computer-readable medium of claim 14, wherein the activity signature is based at least in part on an ephemeral to-be-revealed key.

18. The non-transitory computer-readable medium of claim 17, wherein the activity signature is based at least in part on an expiration date defining a time at which the ephemeral to-be-revealed key is configured to expire.

19. The non-transitory computer-readable medium of claim 14, wherein the blockchain is configured to provide the to-be-revealed information to at least one entity to perform at least one fraud risk assessment.

20. A system comprising:

at least one processor in communication with at least one non-transitory computer readable medium having software instructions stored thereon, wherein the at least one processor, upon execution of the software instructions, is configured to perform a method comprising:

transmitting, to a keyless account service comprising a third-party authentication server, an authentication request, the authentication request comprises at least one of a name, an email address, a phone number, an application identifier, a device identifier associated with the computing device, a user identifier, a social media profile, or any combination thereof;

receiving, from the keyless account service, in response to a positive authentication of the authentication request, an authentication token comprising a keyless account service signature and to-be-revealed information attested to by the keyless account service;

wherein the keyless account service signature is associated with a keyless account service public key of the keyless account service and is computed over at least the following:

a first public key associated with a managing application of a user and the to-be-revealed information attested to by the keyless account service;

generating a request to perform a particular activity and an activity signature, wherein the activity signature is associated with the first public key and is computed over at least the request to perform the particular activity;

submitting, to a blockchain network, via the managing application, the request to perform the particular activity, the activity signature, and at least one proof of knowledge of the keyless account service signature being a valid keyless account service signature computed over at least the to-be-revealed information;

wherein the blockchain network is configured to:

validate the request to perform the particular activity, based at least in part on a verification, using the first public key, of the activity signature;

obtain and reveal the to-be-revealed information based at least in part on a verification, using the keyless account service public key, of the keyless account service signature to generate a revealed information;

validate the keyless account service signature by verifying the at least one proof of knowledge of the valid keyless account service signature, wherein the valid keyless account service signature validates the revealed information as attested to by the keyless account service; and wherein, upon successful validation of the activity signature, and the keyless account service signature, the blockchain network is further configured to:

permit at least one operation based at least in part on the request to perform the particular activity.

21. The system of claim 20, wherein the method further comprises:

submitting, by the at least one processor to the blockchain network, via the managing application, wherein the at least one proof of knowledge comprises a zero-knowledge proof of knowledge (ZKPoK) comprising a zero-knowledge relation applied to at least one secret input comprising the keyless account service signature;

wherein, for the particular activity, the blockchain is configured to validate the ZKPoK of the keyless account service signature and the to-be-revealed information based at least in part on the at least one secret input and the zero-knowledge relation; and wherein the to-be-revealed information comprises a public input to the zero-knowledge relation of the ZKPoK.

22. The system of claim 21, wherein the method further comprises obtaining the ZKPoK of the keyless account service signature using at least one zero-knowledge proving service.

23. The system of claim 20, wherein the activity signature is based at least in part on an ephemeral to-be-revealed key; and wherein the activity signature is based at least in part on an expiration date defining a time at which the ephemeral to-be-revealed key is configured to expire.

24. The system of claim 20, wherein the blockchain is configured to provide the to-be-revealed information to at least one entity to perform at least one fraud risk assessment.

* * * * *